(12) United States Patent
Mcilvain et al.

(10) Patent No.: US 11,593,196 B2
(45) Date of Patent: *Feb. 28, 2023

(54) METHOD AND APPARATUS TO REDUCE BANDWIDTH OVERHEAD OF CRC PROTECTION ON A MEMORY CHANNEL

(71) Applicant: International Business Machines Corporation, Armonk, NY (US)

(72) Inventors: Kevin M. Mcilvain, Delmar, NY (US); Warren E. Maule, Cedar Park, TX (US); Stephen Glancy, Yorktown, VA (US); Kyu-hyoun Kim, Chappaqua, NY (US); Edgar R. Cordero, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,813

(22) Filed: Dec. 1, 2021

(65) Prior Publication Data
US 2022/0091927 A1  Mar. 24, 2022

Related U.S. Application Data

(63) Continuation of application No. 17/000,974, filed on Aug. 24, 2020, now Pat. No. 11,200,112.

(51) Int. Cl.
*G06F 11/10* (2006.01)
*G06F 13/28* (2006.01)
(Continued)

(52) U.S. Cl.
CPC ...... *G06F 11/1004* (2013.01); *G06F 11/1068* (2013.01); *G06F 11/1658* (2013.01); *G06F 11/3037* (2013.01); *G06F 13/28* (2013.01)

(58) Field of Classification Search
CPC ............ G06F 11/1004; G06F 11/1068; G06F 11/1658; G06F 11/3037; G06F 13/28
See application file for complete search history.

(56) References Cited

U.S. PATENT DOCUMENTS

| 4,525,779 A | 6/1985 | Davids et al. |
| 5,610,808 A | 3/1997 | Squires et al. |

(Continued)

OTHER PUBLICATIONS

US 10,042,771 B2, 08/2018, Verrilli et al. (withdrawn)
List of IBM Patents or Patent Applications Treated as Related, dated Dec. 1, 2021, 2 pages.

*Primary Examiner* — Guy J Lamarre
(74) *Attorney, Agent, or Firm* — Scully, Scott, Murphy & Presser, P.C.

(57) ABSTRACT

A method and/or system for checking the bus/interface between a host and a memory system during memory access operations includes a memory system having one or more of the data memory devices and a spare memory device; providing a bus/interface between a host and the memory system; selecting information on a per memory device basis to associate with a spare memory device; disassociating the selected information from the one or more data memory devices and associating the selected information with the spare memory device; adding Cyclical Redundancy Check (CRC) code to the one or more data memory devices from which the selected information was disassociated; transferring the CRC code and information over the bus and interface between the host and the memory system; and checking the bus interface with the CRC code added to the one or more data memory devices.

20 Claims, 11 Drawing Sheets

(51) Int. Cl.
    *G06F 11/30*     (2006.01)
    *G06F 11/16*     (2006.01)

(56) References Cited

U.S. PATENT DOCUMENTS

| | | |
|---|---|---|
| RE44,487 E | 9/2013 | Hughes et al. |
| 8,880,790 B2 | 11/2014 | Haywood |
| 9,940,733 B2 | 4/2018 | Nilsson et al. |
| 9,971,523 B2 | 5/2018 | Kodama et al. |
| 10,019,375 B2 | 7/2018 | Usui et al. |
| 10,019,458 B2 | 7/2018 | Fallon |
| 10,037,275 B2 | 7/2018 | Liu et al. |
| 10,152,249 B2 | 12/2018 | Trantham |
| 10,303,545 B1 * | 5/2019 | Meaney ................ H03M 13/09 |
| 11,200,112 B1 * | 12/2021 | Mcilvain ............. G06F 11/1048 |
| 2010/0005218 A1 | 1/2010 | Gower et al. |
| 2010/0005366 A1 | 1/2010 | Dell et al. |
| 2014/0149833 A1 | 5/2014 | Sauber et al. |
| 2016/0070496 A1 | 3/2016 | Cohen et al. |
| 2018/0018217 A1 | 1/2018 | Cordero et al. |

\* cited by examiner

|      | DQ0 | DQ1 | DQ2 | DQ3 | DQ4 | DQ5 | DQ6 | DQ7 |
|------|-----|-----|-----|-----|-----|-----|-----|-----|
| BL0  | 0   | 16  | 32  | 48  | 64  | 80  | 96  | 112 |
| BL1  | 1   | 17  | 33  | 49  | 65  | 81  | 97  | 113 |
| BL2  | 2   | 18  | 34  | 50  | 66  | 82  | 98  | 114 |
| BL3  | 3   | 19  | 35  | 51  | 67  | 83  | 99  | 115 |
| BL4  | 4   | 20  | 36  | 52  | 68  | 84  | 100 | 116 |
| BL5  | 5   | 21  | 37  | 53  | 69  | 85  | 101 | 117 |
| BL6  | 6   | 22  | 38  | 54  | 70  | 86  | 102 | 118 |
| BL7  | 7   | 23  | 39  | 55  | 71  | 87  | 103 | 119 |
| BL8  | 8   | 24  | 40  | 56  | 72  | 88  | 104 | 120 |
| BL9  | 9   | 25  | 41  | 57  | 73  | 89  | 105 | 121 |
| BL10 | 10  | 26  | 42  | 58  | 74  | 90  | 106 | 122 |
| BL11 | 11  | 27  | 43  | 59  | 75  | 91  | 107 | 123 |
| BL12 | 12  | 28  | 44  | 60  | 76  | 92  | 108 | 124 |
| BL13 | 13  | 29  | 45  | 61  | 77  | 93  | 109 | 125 |
| BL14 | CRC0 | CRC1 | CRC2 | CRC3 | CRC4 | CRC5 | CRC6 | CRC7 |
| BL15 | CRC8 | CRC9 | CRC10 | CRC11 | CRC12 | CRC13 | CRC14 | CRC15 |

Fig. 12B

METHOD AND APPARATUS TO REDUCE BANDWIDTH OVERHEAD OF CRC PROTECTION ON A MEMORY CHANNEL

CROSS REFERENCE TO RELATED APPLICATION

This application is a continuation of U.S. patent application Ser. No. 17/000,974, filed Aug. 24, 2020, now U.S. Pat. No. 11,200,112, the entire content and disclosure of which is incorporated herein by reference.

BACKGROUND

The present invention relates to computer architecture, processing and memory systems, and more specifically to Recoverability, Availability and Serviceability (RAS) needs including cyclical redundancy code (CRC) protection in memory systems/subsystems.

With recent advancement of information technology and wide use of the internet to store and process information, more and more demands are placed on the acquisition, processing, storage and dissemination of information by computing systems. Computing systems are being developed to increase the speed at which computers are able to execute increasingly complex applications for business, personal use, and entertainment. Overall computer system performance is affected by each of the key elements of the computer structure, including the performance, efficiency, and structure of the processors, any memory caches, input/output (I/O) subsystems, memory control functions, memory devices and systems, and any associated memory interface or interconnect elements.

The constantly increasing speed of processors which execute increasingly complex applications places more rigorous performance demands on all of the other subsystems in the computer, including the memory subsystem, where data is stored, accessed, and updated numerous times during the operation of an application or program. The time consumed by memory read/write operations is a major factor in the ultimate speed and efficiency of a computer system. The memory subsystem of most computers is normally operated by a memory controller. The task of memory controllers is to move data between the computer's memory subsystem and its one or more processors as quickly and efficiently as possible. In many memory subsystems, the memory controller may control multiple memory devices. The memory devices may be arranged in ranks and/or channels. A computer's memory subsystem often comprises memory modules, usually one or more dual in-line memory modules (DIMMs) that include several memory devices, e.g., dynamic random access memory (DRAM) devices. The DIMMs may have one or more ranks and channels of memory devices.

Computing demands require the ability to access an increasing number of higher density memory devices at faster and faster access speeds. Extensive research and development efforts are invested by the industry to create improved and or innovative solutions to maximize overall system performance by improving the memory system/subsystem design, the manner in which the processor and memory system/subsystem interact, and/or structure and the methods by which the memory system/subsystem operates. Such efforts have resulted in the development of distributed memory systems, distributed buffer memory systems, registered DIMMs (RDIMMs) load reduced DIMMs (LRDIMMs), and other memory systems, as well as specifications and standards such as, for example, DDR4 and DDR5, which provide for increased memory performance and standardization.

There are interfaces, communication links, and/or buses between a host processor and the memory subsystem. Bandwidth limitations on communication and data links can affect performance of memory systems. As performance of memory systems increases (e.g., speed and capacity), recoverability, availability and serviceability (RAS) are also important considerations. The RAS, power/thermal and performance (bandwidth, latency, speed) needs of a high end server or mainframe computer are very different from a low end personal computer. In order to increase reliability and to prevent or at least lower the risk of computer failure, different forms of error detection and correction processes have been developed. One commonly used system for error detection is the use of cyclical redundancy check (CRC). Cyclical redundancy check (CRC) is an error detection code commonly used in digital networks and storage devices to detect changes in raw data, and is particularly good at detecting errors caused by noise transmission in channels. When enabled, CRC protection creates a CRC code that is transmitted along with data. While CRC protection provides a check on the transmission of data, it comes with its penalties including a bandwidth penalty on the links and buses between the host and memory subsystem, e.g., the memory devices.

SUMMARY

The summary of the disclosure is given to aid understanding of information handling systems, processors, and memory systems, their architectural structures, and methods of storing and fetching data, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the information handling systems, processors, memory systems, their architectural structures, and methods of operation to achieve different effects.

In an embodiment, a technique, process, processor, and/or system for storing data is disclosed. The technique, process, processor, and/or memory system in one or more embodiments includes a plurality of memory devices configured to store data, each memory device having a plurality of cells for storing a plurality of bits of data, the memory devices configured and associated to work together preferably as one or more ranks on one or more channels to respond to request(s). In an embodiment, a method for checking the bus interface between a host and a memory system during memory access operations includes providing a memory system having a plurality of memory devices, each memory device having a plurality of cells to store information, at least one or more of the memory devices configured to store data and at least one or more of the memory devices configured as a spare memory device; providing a host having one or more processors for processing data; providing a bus interface between the host and the memory system; selecting information on a per memory device basis to associate with one or more of the spare memory devices; disassociating the selected information from the one or more memory devices and associating the selected information with one or more of the spare memory devices; adding Cyclical Redundancy Check (CRC) code to the one or more memory devices from which the selected information was disassociated; and transferring the CRC code and information over the bus and interface between the host and the plurality of memory devices. The method in an aspect includes checking the bus and interface between the host and the one or more memory devices to which CRC code was added. The method in one or more embodiments further includes performing a read operation that includes transferring data and CRC code from the plurality of memory devices over the bus and interface to the host; checking, by the host, the CRC code transferred over the bus and interface; discarding, by the host, the CRC code transferred over the bus and interface; and obtaining, by the host, the data transferred from at least one of the spare memory devices over the bus and interface to the host. The method further includes performing a write operation to the memory system that includes transferring data and CRC code from the host over the interface and bus to the plurality of memory devices including at least one of the spare memory devices; checking, by the memory device that received the CRC code, the CRC code transferred over the interface and bus to the memory device that received the CRC code; and saving the data and the CRC code in the plurality of memory devices and at least one of the spare memory devices.

In an aspect, an information handling system is disclosed where the information handling system includes a memory subsystem comprising a plurality of memory devices arranged on a module, each of the plurality of memory devices comprising a plurality of memory cells to store information, the plurality of memory devices including a group of memory devices configured to store data and at least one spare memory device; a processor having a memory controller for controlling the transfer of information between the processor and the memory subsystem; an interface and bus between the processor and the memory subsystem, the interface and bus comprising one or more data lanes for transferring information between the processor and each of the plurality of memory devices in the memory subsystem; the information handling system configured to: select information on a per memory device basis to associate with one or more of the spare memory devices; disassociate the selected information from the one or more memory devices and associate the selected information with one or more of the spare memory devices; add Cyclical Redundancy Check (CRC) code to the one or more memory devices from which the selected information was disassociated; and transfer the CRC code and information over the bus and interface between the processor and the plurality of memory devices. In an embodiment the plurality of memory devices are configured as a single channel having an interface width wherein one or more bits of the interface width are comprised of the group of memory devices for storing data, one or more bits of the interface width are comprised of one or more memory devices configured to handle error correction code (ECC), and one or more bits of the interface are comprised of one or more memory devices configured as the at least one spare memory device, and wherein the system is further configured to select at least two bursts of data from at least one data memory device to be associated with the at least one spare memory device.

A method of writing information from a processor to a memory system for storing information is also disclosed where the method includes: providing a memory system having a plurality of memory devices configured to store information, wherein at least one memory device is configured as a spare memory device and a group of the memory devices are configured as data memory devices to store data; providing a processor configured to handle and process information; providing an interface and bus between the memory system and the processor to transfer information from the processor to the memory system; selecting data associated with a burst transaction of at least one of the data memory devices to be associated with a burst transaction of the at least one spare memory device; disassociating the selected data associated with the burst transaction of at least one of the data memory devices and associating the selected data with the burst transaction of the spare memory device; adding cyclical redundancy check (CRC) code to the burst transaction of the at least one data memory device that had the selected data disassociated; and transferring the data and the CRC code during the burst transaction over the interface bus from the processor to the memory system. The method further includes saving the data and the CRC code in at least one of the data memory devices, and saving data in the at least one spare memory device. In a further aspect, a method of performing a read operation is disclosed that includes: transferring the data and CRC code saved in the at least one data memory device over the interface and bus from the at least one data memory device to the processor; and checking, by a memory controller residing on the processor, the CRC code transferred over the interface and bus from the at least one data memory device to the processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of information handling systems, processors, and memory systems, their architectural structures and methods of operation will be better understood when read in conjunction with the figures provided. Embodiments are provided in the figures for the purpose of illustrating aspects, features, and/or various embodiments of information handling systems, processors, memory systems, their architectural structures, and methods of operation, but the claims should not be limited to the precise arrangement, structures, assemblies, subassemblies, functional units, circuitry, features, aspects, embodiments, devices, mechanisms, methods, processes, or techniques shown, and the arrangements, structures, assemblies, subassemblies, functional units, circuitry, features, aspects, embodiments, devices, mechanisms, methods, processes, and techniques shown may be used singularly or in combination with other arrangements, structures, assemblies, subassemblies, functional units, circuitry, features, aspects, embodiments, devices, mechanisms, methods, processes, and techniques.

FIG. 9 depicts the bit mapping of a data memory device and a spare memory device on a memory module where the module is in a single channel lock step mode of operation in accordance with an embodiment of the present disclosure.

FIG. 10 depicts the bit mapping of the data memory device and a spare memory device on a memory module operating in a single channel lockstep mode where the data from one of the data memory devices has been mapped to the spare memory device and CRC has been added to the data memory device in accordance with an embodiment of the present disclosure.

FIGS. 12A & 12B depict the bit mapping of data, on a memory module operating as a single channel in normal mode, from a data memory device to a spare bit lane in an ECC memory device where CRC has been added to the data memory device in accordance with another embodiment of the present disclosure.

DETAILED DESCRIPTION

The following description is made for illustrating the general principles of the invention and is not meant to limit the inventive concepts claimed herein. In the following detailed description, numerous details are set forth in order to provide an understanding of information handling systems, processors, memory systems, their architectural structures, and methods of operation, however, it will be understood by those skilled in the art that different and numerous embodiments of information handling systems, processors, memory systems, their architectural structures, and methods of operation may be practiced without those specific details, and the claims and invention should not be limited to the arrangements, structures, embodiments, assemblies, subassemblies, features, functional units, circuitry, processes, methods, aspects, features, or details specifically described and shown herein. Further, particular features, aspects, embodiments, functional units, circuitry, and/or components described herein can be used in combination with other described features, aspects, embodiments, functional units, circuitry, and/or components in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
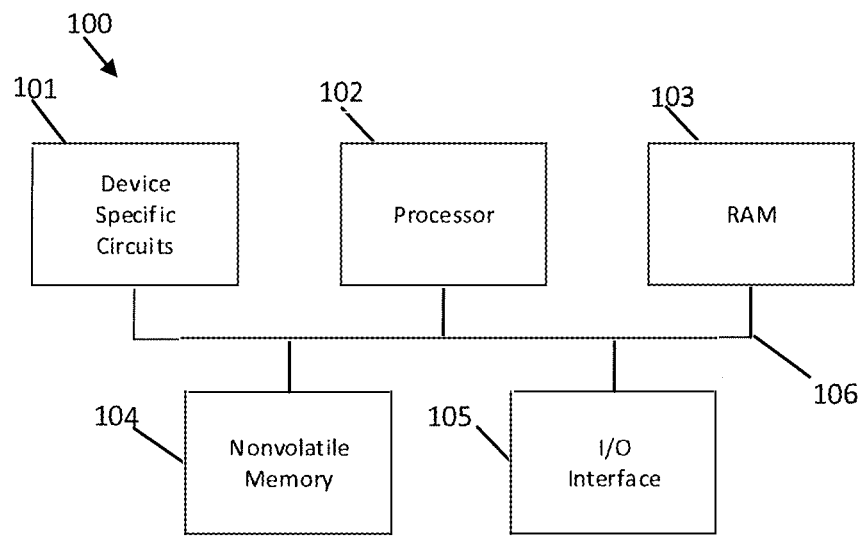
FIG. 1 depicts a general computing or data processing system.

A computing or information handling (data processing) system 100 suitable for storing and/or executing program code may take many forms and in one embodiment may include at least one processor 102, which may be or be part of a controller, coupled directly or indirectly to memory devices or elements through a system bus 106, as shown in FIG. 1. Computing or information handling system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may include Dynamic Random Access Memory or DRAM. In one embodiment, the RAM 103 may comprise Double Data Rate (DDR) synchronous DRAM or SDRAM. The RAM 103 may include memory devices arranged on a module, such as, for example, Dual Inline Memory Modules, also known as DIMMs.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as, for example, Automation/Drive Interface (ADI).

Figure 2:
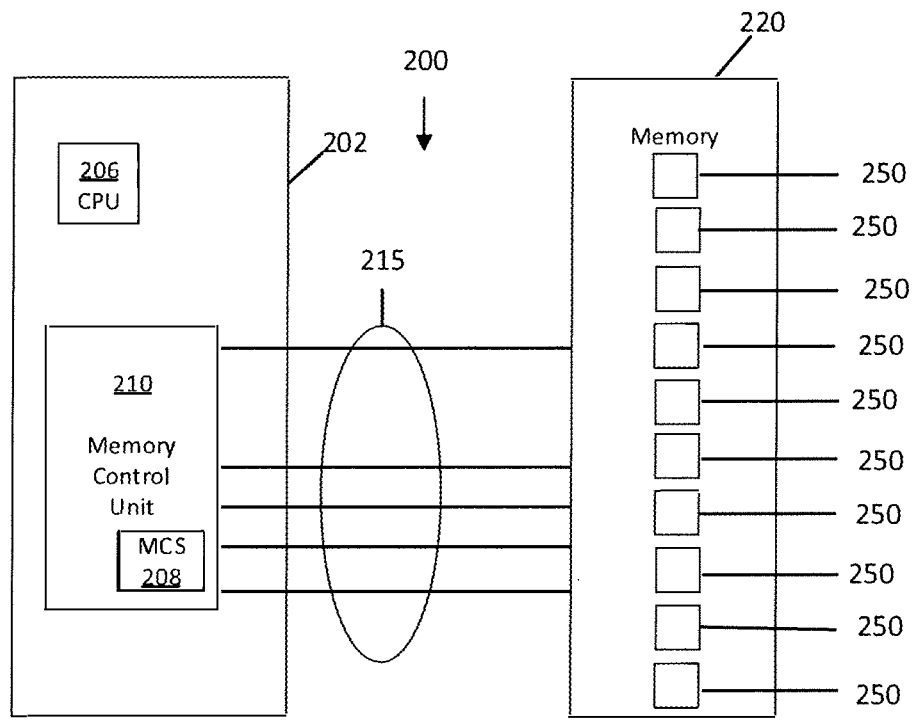
FIG. 2 depicts a computing or processing system including a memory subsystem in accordance with one embodiment.

FIG. 2 depicts an exemplary processing system 200 that may be part of a larger computer or information handling system structure or network. The processing system 200 includes a control processor system or processor 202, which is a processing subsystem that includes at least one processor unit (CPU) or microprocessor 206 that may be configured to interface with a Memory Control Unit (MCU) 210. The microprocessor or CPU 206 may be a module that processes read, write, and configuration requests from a system controller (not depicted). The microprocessor 206 may be a multi-core processor. The MCU 210 may include a memory controller synchronous (MCS) 208, also referred to as a memory controller, that controls communications with one or more memory devices 250 in a memory subsystem 220. The MCU 210 and the MCS 208 may include one or more processing and logic circuits, or processing may be performed by or in conjunction with the microprocessor 206. The processing system 202 communicates with the memory subsystem 220 through a communications bus 215. Control processor system 202, processor or CPU 206, memory control unit (MCU) 210, and MCS 208, individually and collectively, may be referred to herein as the Host. The Host as used herein is used broadly to refer to a processor, controller, or device that sends and receives command and/or control signals to a memory system or subsystem. The Host typically also sends and receives data (signals) from a memory system or subsystem.

Systems, architectures, and/or methods of managing and transmitting data, error correction code (ECC) and CRC protection between a memory system or subsystem and a host (processor) are disclosed. In an embodiment, a system, architectural structure, and/or method of using a memory channel comprised of one or more ranks, that includes one or more memory devices for RAS capabilities (e.g., error correction code (ECC) and CRC protection) is disclosed. In one aspect, a system, architecture, and/or method is disclosed for spreading data across the memory module, e.g., a dual-inline memory module (DIMM), that includes a plurality of memory devices, including into spare memory devices, to permit data transfer with CRC encoding without requiring additional bandwidth, for example without longer bursts across the communication links and/or buses 215 between the host (processor) and the memory subsystem.

The system, architecture, and method of implementing CRC protection according to an embodiment can be controlled and performed by a memory controller with logic. The process and system may be implemented in one aspect with no or minimal changes to the memory channel. The method, system, and architecture would work during memory operations, e.g., read or write operations, and would spread the data, ECC, and CRC code across the DIMM, and in one or more embodiments spread the data, ECC, and CRC code across the entire DIMM, and in an aspect into one or more spare memory devices on the DIMM. By spreading the data, ECC, and CRC code across the DIMM including the spare memory device(s), data transfer with CRC coding can occur with the same Burst Length, e.g., BL 16, as data transfer without CRC protection. It should be apparent to one skilled in the art that the advantages of this design may be applied to any system with spare memory devices on the DIMM, and/or spare bits in one or more memory devices on the DIMM, and while the technique is explained and described with reference to DDR5 memory, this technique and disclosure is not limited to DDR5 memory devices and/or modules. The method, system, and architecture can be implemented and employed in other configurations and embodiments as will be evident from the disclosure and teaching herein.

Figure 3:
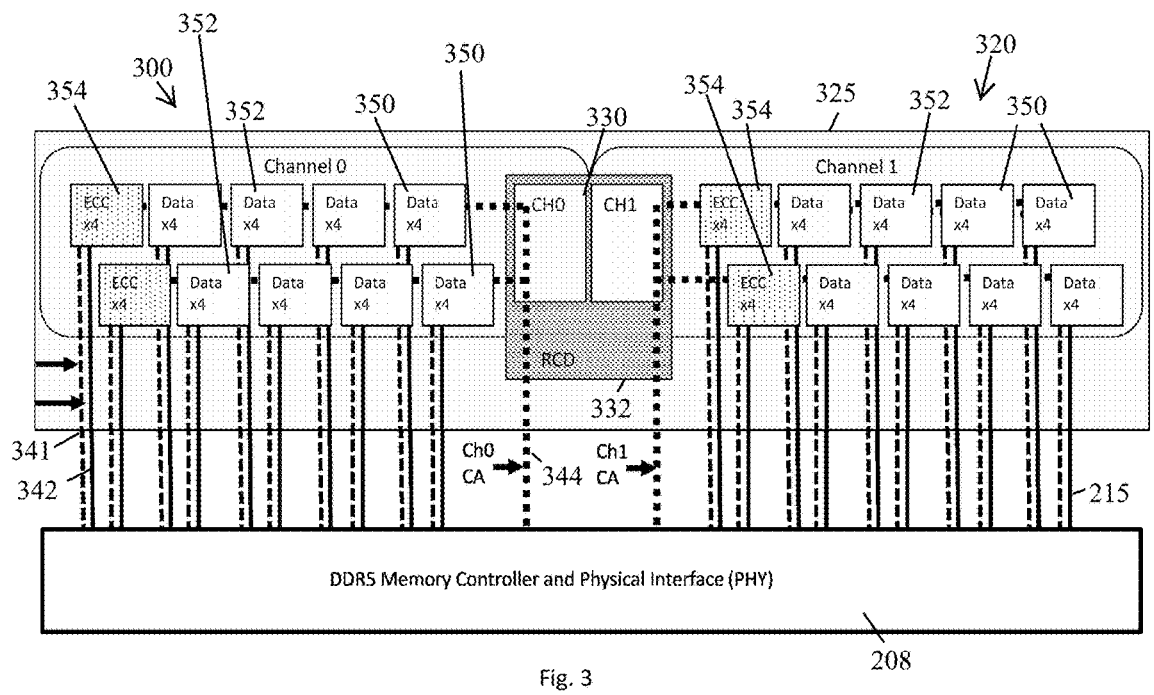
FIG. 3 depicts a host interface and memory subsystem having a plurality of memory devices in accordance with an embodiment of the present disclosure.
Figure 4:
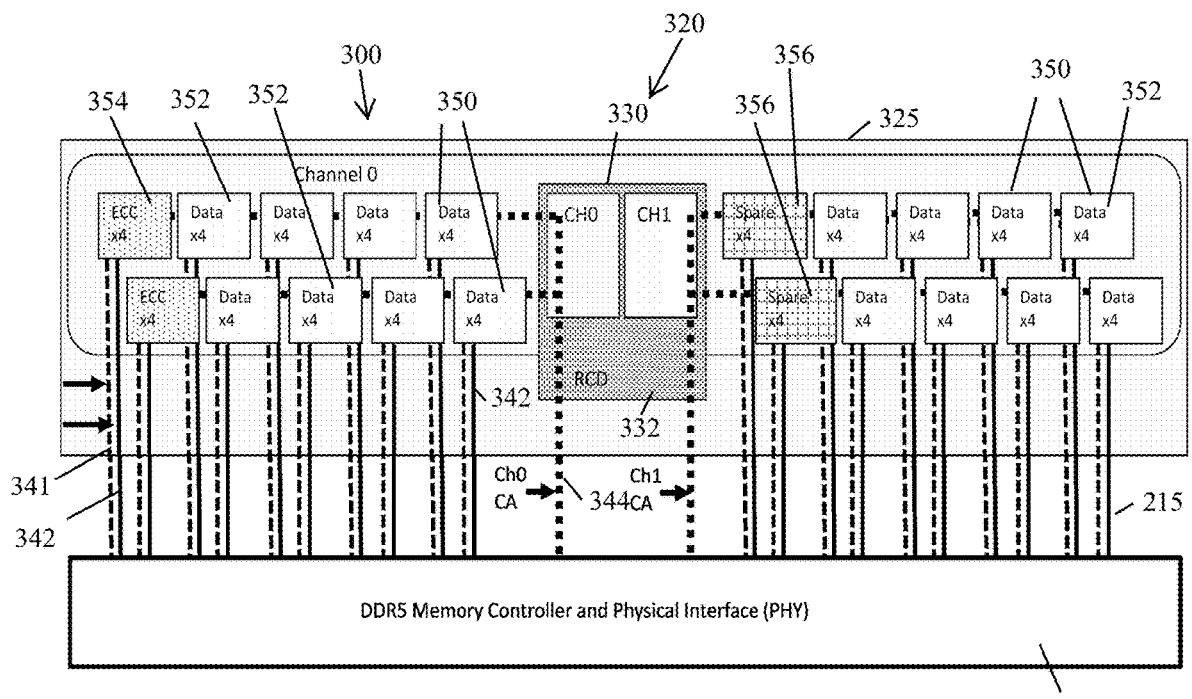
FIG. 4 depicts a host interface and memory subsystem having a plurality of memory devices in accordance with another embodiment of the present disclosure.
Figure 5:
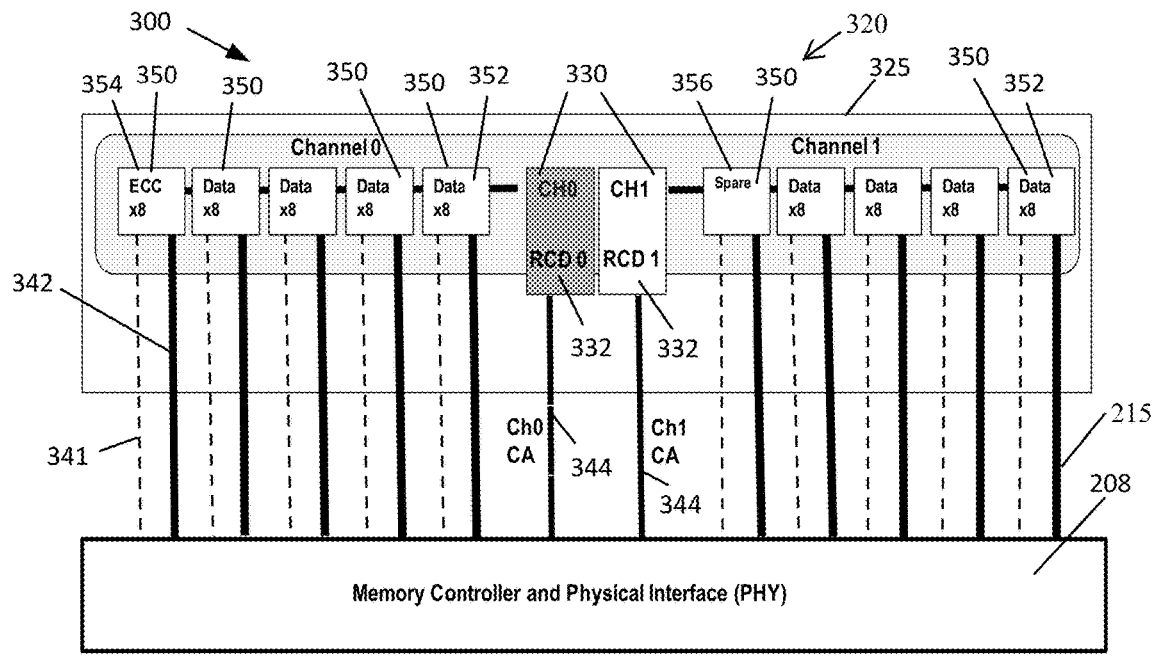
FIG. 5 depicts a host interface and memory subsystem having a plurality of memory devices in accordance with another embodiment of the present disclosure.
Figure 6:
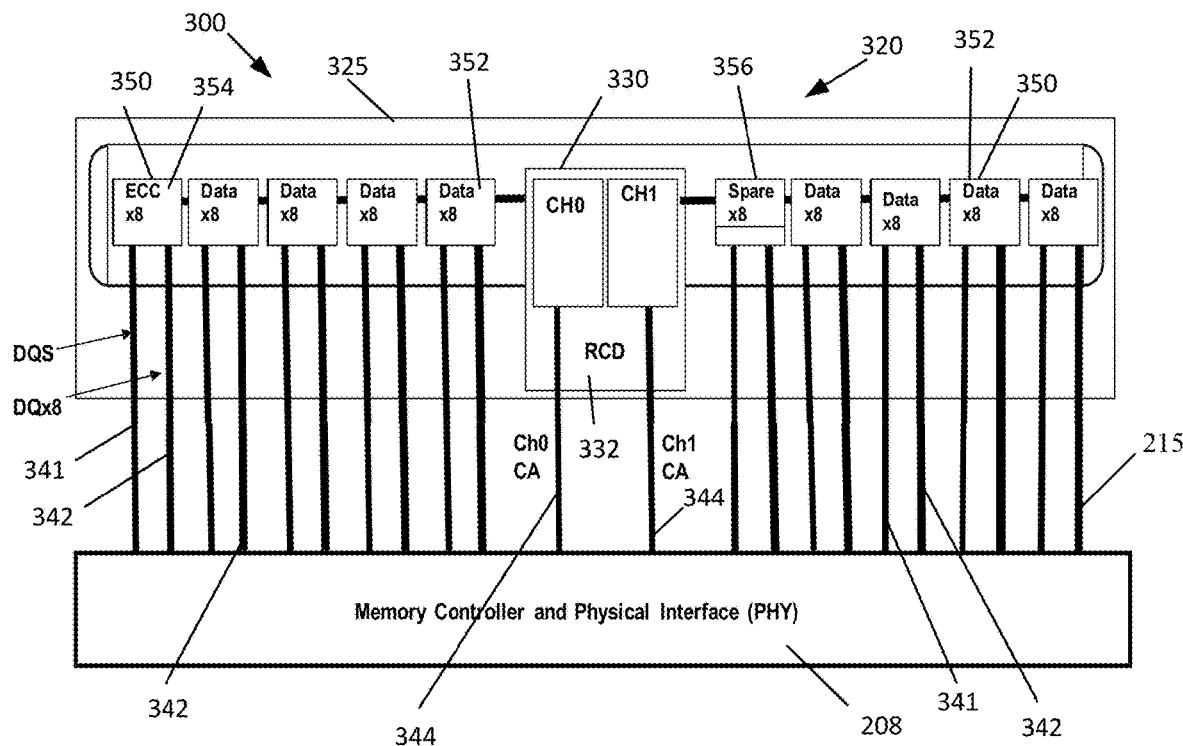
FIG. 6 depicts a host interface and memory subsystem having a plurality of memory devices in accordance with another embodiment of the present disclosure.

FIGS. 3-6 depict examples of processor-memory system 300 having a host interface 208 and a memory subsystem 320. FIGS. 3 and 6 show memory system 320 having a memory module 325, e.g., a Dual Inline Memory Module or DIMM, but it will be appreciated that memory subsystem 320 may contain more or less memory modules (DIMMs) 325, and usually has a number of memory modules 325, e.g., DIMMS. FIGS. 3-6 show a system and architecture preferably consistent with DDR5. Each DIMM 325 may contain one or more memory devices 350, e.g., DRAMs 350. The memory devices preferably are DRAMs, and are preferably Double Data Rate (DDR) synchronous DRAMs, although other memory devices are contemplated.

The memory devices 350 may be integrated circuits or chips and form the basic memory cells that hold bits of information. The memory cells in a memory device, e.g., DRAM, are usually arranged in banks, where each bank is an array of rows and columns. There is typically a plurality of banks in the memory devices, e.g., DRAMs. The memory devices 350 typically have a bit width of 4, 8 or 16, which is indicated by the designation x4, x8, or x16. For example, FIGS. 3-4 show x4 memory devices where one beat or cycle during an operation, e.g., a read or write operation, would access four (4) bits of the x4 memory device. FIGS. 5-6 show x8 memory devices where one beat or cycle during an operation would access eight (8) bits of the x8 memory device. And, for a x16 memory device (not shown), one beat or cycle during an operation, e.g., a read or write operation, would access sixteen (16) bits of the x16 memory device.

Often, the memory devices are arranged in ranks which are a grouping of one or more devices that comprise a data bus or channel, so that a cycle reads or writes to multiple memory devices during the cycle. A rank or channel is generally a set of memory devices 350 that receive and respond to the same command and same address at the same time with different pieces of requested data. For example, with four (4) x8 memory devices arranged as a rank, one beat or cycle would read or write thirty-two (32) bits from the memory devices. A memory channel may also consist of multiple ranks of memory devices where each rank is selected by signals on the command address channel where typically only one rank of devices may respond to the same command and same address at the same time with different pieces of requested data. Multiple rank architectures may have separate groupings of memory devices each in their own package or multiple memory devices within a package, for example dual die packages, 3D stacks. The plurality of memory devices 350 on the DIMM 325 may be arranged in channels/ranks, with one or more ranks for each one or more channels on a DIMM 325, or on multiple DIMMs 325. For example, FIG. 3 shows twenty (20) x4 memory devices 350 configured on DIMM 325, where the memory devices 350 can be configured as two channels (Ch0 and Ch1) where each channel has ten (10) memory devices 350, or for example FIG. 4 where the memory devices 350 can be configured as a single channel having twenty (20) memory devices 350. Other configurations are contemplated for the memory module 325, and for the memory subsystem 320. The memory system architecture may be formatted and structured to support DDR4 and DDR5 standards, and may include UDIMMs, RDIMMs, LRDIMMs, DDIMMs, NVDIMMs (N&P), and SODIMMs, although the methods, systems, and architecture disclosed and taught would be applicable to other configurations and types of DIMMs, including future DDR standards.

In addition, a memory operation, e.g., a read or write operation, may contain multiple beats during a single memory access transaction. For example, an operation, e.g., a read or write, may have a burst length (BL) of sixteen (BL 16), indicating sixteen (16) beats or cycles in the read/write operation (transaction). In one example, a read operation of four (4) x8 memory devices arranged and configured for a burst length of sixteen (BL 16) would have sixteen (16) beats reading thirty-two (32) bits in each beat, for a total of 512 bits (64 bytes) read during the burst transaction. In another example, an operation (read or write) in a configuration having eight (8) x8 memory devices configured for a burst length of eight (BL 8), would have eight (8) beats accessing sixty-four (64) bits in each beat, for a total of 512 bits (64 bytes) accessed during the burst transaction.

The memory subsystem may also include one or more Address Command (AC) chips 330, preferably one AC chip for two channels, and one or more data buffer or data circuits (DC), also known as DB chips (not shown). In an example, the AC and DC chips may be combined into one chip, but in embodiments are separate circuits and/or chips on the memory module. Alternatively, in one or more embodiments, the memory system may include one or more AC chips alone, without any DC chips, or one or more DC chips alone, without any AC chips. The Address Chip(s) 330 manages the flow of data going to and from, and access to the memory devices 350. The Address Chip 330 typically receives signals such as command and control signals from a host, e.g., a processor. The Address Chip 330 may output command and control signals to control the flow of data going to and from the memory devices 350. The command and control signals may include address locations or tags indicating where to store data in the memory devices 350 and/or data buffer circuits. The Address Chip 330 preferably has one or more Registered Clock Drivers (RCDs) 332. Typically there is one RCD on the DIMM where the RCD can mange one or more channels. Each memory module 325 may have one RCD 332 as shown in FIGS. 3, 4 and 6, or multiple RCDs 332, for example for the different channels, as shown in FIG. 5. The DIMMs 325 in FIGS. 4 and 6 have a single Address Chip 330 capable of handling two channels (Ch0 and Ch1), although two separate Address Chips one for each channel could alternatively be used as shown in FIG. 5.

The Address Chip 330 typically sends out signals to the data buffer circuits and/or the memory devices 350. The Address Chip 330 manages fetch (read) operations, store (write) operations, and memory device, e.g., DRAM, periodical operations such as, for example, refresh operations, to optimize system performance. The Address Chip 330 may or may not be located on the board or module, e.g., DIMM, with the memory devices 350. In embodiments, as shown in FIGS. 3-6, one or more Address Chips 330 are formed as integrated circuits or chips and are located on the module 325 with the memory devices 350. In the embodiments of FIGS. 3, 4 and 6, one Address Chip 330 is on each DIMM 325 and controls and manages the memory devices 350 on the DIMM 325. In the embodiments of FIG. 3, two or more RCDs 332 are implemented on the module 325.

The data buffer circuits buffer, receive, transmit, and/or transfer data between the host, e.g., processor 102, and the memory devices 350 (and 250). The data buffer circuits may also be referred to as data circuits, DC circuits, and/or DB chips. The data buffer circuits are typically located on the same board or module, e.g., DIMM, as the memory devices 350 and/or the Address Chip 330, but can be located off the module 325. While not illustrated in FIGS. 3-6, the data buffer circuits in one embodiment are also formed as integrated circuits or chips and are located on the module 325 with the memory devices 350. There can be one data buffer circuit for each memory device on the module, and/or one data buffer circuit for each memory device in a rank or channel. Other configurations for the data buffer circuits are also contemplated.

The memory or data storage system 320 may be configured to store data and to provide storage services to one or more hosts, e.g., processors, which can be connected to the storage system 320 directly or through a network (e.g., over the internet). The memory storage system 300 may include an interface 208 shown in FIGS. 3-6 for supporting communications with the host. For ease of illustration in FIGS. 3-6, data buses (DQ) 342 are diagrammatically shown between the memory module 325 (e.g., memory devices 350) and the Host memory controller interface 208 for transmitting data, and communication buses 344 are shown between the memory module 325 (e.g., Address Chip 330) and Host memory controller interface 208 for transmitting command and address signals (CA). It can be appreciated that there can be data buses 342 to transmit data between the host memory controller interface 208 and the data buffer circuits (not shown), and further data buses (not shown) to transmit data between the data buffer circuits and the memory devices 350. There is also a data strobe signal (DQS) 341 diagrammatically shown in FIGS. 3-6 between the host memory controller 208 and the memory module 325 (e.g., memory devices 350). In FIGS. 3-4, where the memory devices 350 are x4 memory devices, each data bus 342 represents four lanes for transmitting data, e.g., DQx4; while in FIGS. 5-6, where memory devices 350 are x8 memory devices, each data bus 342 represents eight lanes for transmitting data, e.g., DQ x8.

As performance of memory systems increase (e.g., speed and capacity), recoverability, availability and serviceability (RAS) are important considerations. In order to increase reliability and to prevent or at least lower the risk of computer failure, different forms of error detection and correction processes have been developed. Error correction code (ECC) is one form of RAS measures used in information handling systems. In one or more embodiments, the memory controller includes ECC logic which provides data correction for memory errors. While ECC provides protection against memory errors, it comes with its penalties including a memory penalty on the amount of memory required to store the ECC code, a latency and/or bandwidth penalty on the links and buses between the host and memory subsystem to transmit the ECC code, and a latency penalty to generate and check the ECC. Generally, using conventional techniques and ECC logic, seven (7) bits of memory overhead are required for ECC to cover thirty-two (32) bits of data in a beat, and eight (8) bits of memory overhead are required for ECC to cover sixty-four (64) bits of data in a beat. The number of memory devices used for ECC depends upon multiple factors, including but not limited to the type of error check and correction code (ECC) used, the amount of data being checked, and the number of data errors to be corrected.

Another commonly used system for error detection is the use of cyclical redundancy check (CRC). Cyclical redundancy check (CRC) is an error detection code commonly used in digital networks and storage devices to detect changes in raw data, and is particularly good at detecting errors caused by noise transmission in channels. When enabled, CRC protection creates a CRC code that is transmitted along with data. The CRC code typically is checked at the device that receives the data. On a write operation, CRC code typically is generated at the host and checked at the memory device. On a read operation, CRC code typically is generated at the memory device and checked at the host (processor). The CRC code typically is checked immediately upon transmission to determine if the data was received correctly. The CRC codes typically are not stored in memory. CRC protection protects the interface, e.g., serves as a check on the transmission of data. While CRC protection provides a check on the transmission of data, it also comes with its penalties including a bandwidth penalty on the links and buses between the host and memory subsystem, e.g., the memory devices, to transmit CRC code. For example, in an industry standard (IS) DDR5 DIMM, transmission of CRC would add enough bits to a BL16 data transfer to consume an additional two bursts (BL2) of data transfer.

FIG. 3 is consistent with DDR5 standards and the DIMM or memory module 325 includes twenty (20) memory devices 350 that can be arranged in one or two channels with one or more ranks per channel, and in FIG. 3 is arranged as two channels with ten (10) x4 memory devices 350 in each channel. The x4 memory devices 350 each have a four (4) bit wide interface, and the data bus 342 between the host 208 and each memory device 350 has four lanes (DQx4) for transmitting data. When arranged as two channels as in FIG. 3, each channel has a forty (40) bit interface 208 that in an example has eight 4 data memory devices 352 to transmit 32 bits of data per beat, and two x4 memory devices 350 that can be configured to handle ECC and/or as spare memory devices. When configured to handle ECC, 7 bits of ECC are used to handle 32 bits of data transmitted per beat. In FIG. 3, channel 0 of memory module 325 has two ECC memory devices 354 to handle ECC, and channel 1 is similar in configuration to channel 0. Other configurations for each channel are contemplated for the memory module 325 in FIG. 3. The memory module 325 in FIG. 3 has a single RCD 332, although it can be appreciated that two RCDs 332 could be used, one RCD 332 for each channel. The memory module 325 in FIG. 4 is similar to memory module 325 in FIG. 3. The memory module 325 in FIG. 4 can be configured to operate as a single channel where each of the twenty (20) memory devices 350, e.g., DDR DRAMs, has a four (4) bit wide interface (x4) to support an eighty (80) bit interface 208 and bus 215 where eighty (80) bits per cycle or beat are transferred, and sixteen (16) of the x4 memory devices 350 are configured as data memory devices 352 to support sixty-four (64) bits of data per cycle, two x4 memory devices 350 are configured as ECC memory devices 354 to support ECC, and two x4 memory devices 350 are utilized as spare memory devices 356. While memory devices 350 have been described as data memory devices 352, ECC memory devices 354, and/or spare memory devices 356, it should be appreciated that each of the memory devices 352, 354, and 356 typically are the same.

FIG. 5 illustrates DIMM or memory module 325 having ten (10) memory devices 350 that can be arranged in one or two channels with one or more ranks per channel, and in FIG. 5 is arranged as two channels with five (5) x8 memory devices 350 in each channel. The x8 memory devices 350 each have an eight (8) bit wide interface, and the data bus 342 between the host 208 and each memory device 350 has eight lanes (DQx8) for transmitting data. When arranged as two channels as in FIG. 5, each channel has a forty (40) bit interface that in an example has four x8 memory devices 352 to transmit 32 bits of data per beat, and one x8 memory device 350 that can be configured to handle ECC and/or as a spare memory device. When configured to handle ECC, 7 bits of ECC are used to handle 32 bits of data transmitted per beat leaving one bit as a spare bit lane. In FIG. 5, channel 0 of memory module 325 has one ECC memory device 354 to handle ECC, and channel 1 has one spare memory device 356. Other configurations for each channel are contemplated for memory module 325 in FIG. 5. The memory module 325 in FIG. 5 has two separate RCDs 332, although it can be appreciated that a single RCD 332 could be used for both channels. The memory module 325 in FIG. 6 is similar to the memory module 325 in FIG. 5, but with a single RCD 332. The memory module 325 in FIG. 6 is configured to operate as a single channel where each of the ten (10) memory devices 350, e.g., DDR DRAMs, has an eight (8) bit wide interface (x8) to support an eighty (80) bit interface 208 and bus 215 where eighty (80) bits are transferred per cycle or beat, and eight (8) of the x8 memory devices 350 are configured as data memory devices 352 to support sixty-four (64) bits of data per cycle, one x8 memory device 350 is configured as an ECC memory device 354 to support ECC, and one x8 memory device 350 is utilized as a spare memory device 356. While memory devices 350 have been described as data memory devices 352, ECC memory devices 354, and/or spare memory devices 356, it should be appreciated that each of the memory devices 352, 354, and 356 typically are the same. If 16 bit wide memory devices, e.g., x16 DRAMs, are used on the memory module 325, then the number of memory devices 350 per rank and channel can change to meet the thirty-two (32) or sixty-four (64) bit wide data transfer per cycle, and the corresponding ECC for each cycle or burst.

In one or more embodiments, the DIMM in FIG. 4 is a DDR5 industry standard (IS) DIMM where both channels are configured to operate together as one channel (in lockstep). Operating the ISDIMM in FIG. 4 as one channel provides a 80 bit interface 208 and bus 215, with 64 bits (sixteen of the x4 data memory devices 352) for data, 8 bits (two x4 ECC memory devices 354) for ECC, and 8 bits (two x4 spare memory devices 356) as spares. The total DDR Bus width is eighty (80) bits wide and is equal to the data width (64b), the ECC width (8b for 64b), and the spare width (8b), in this example 80 bits. A typical read or write operation in DDR5 will have a burst length of 16 (BL 16), which for the ISDIMM of FIG. 4 transmits 1280 bits (80 bits per cyclex16). In one or more embodiments, the DIMM in FIG. 6 is a DDR5 industry standard (IS) DIMM where both channels are configured to operate together as one channel (in lockstep). Operating the ISDIMM in FIG. 6 as one channel provides a 80 bit interface 208 and bus 215, with 64 bits (eight of the x8 data memory devices 352) for data, 8 bits (one x8 ECC memory device 354) for ECC, and 8 bits (one x8 spare memory device 356) as a spare. The total DDR Bus width is equal to the data width (64b), the ECC width (8b for 64b), and the spare width (8b). A typical read or write operation in DDR5 will have a burst length of 16 (BL 16) which for the ISDIMM of FIG. 6 transmits 1280 bits (80 bits per cyclex16). The configurations of the ISDIMMs of FIGS. 4 and 6 with BL 16 would provide 1024 bits for data transmission, 128 bits for ECC transmission, and 128 bits for the spare. Rather than confining the data transmission to a subset of the memory devices (eight of the x8 memory devices or 16 of the x4 memory devices), the data in one or more embodiments is spread across the DIMM and into the spare memory device(s) which permits data transfer with ECC and with CRC encoding to happen within a burst length of 16 (BL 16).

CRC code is typically ATM-8 HEC polynomial which uses 8b to cover 72b of data. On a per memory device basis, for a x4 device operating at BL16, as per DDR5 standards, there would be 64b (4b×BL16) of data in the transfer, which is less than 72b of data so 8b of CRC code will cover the data transfer. As each memory device is x4, 8b of CRC code will take 2 transfers or bursts (BL2) on a per memory device basis to handle using ATM-8 HEC polynomial or a different polynomial that uses 8b to cover 72b of data. On a per memory device basis, for a x8 memory device operating at BL16, 144 bits (16×8 bits per cycle) is utilized in a data transfer, which is greater than 72b, so two (2) eight (8) bit CRC codes or 16b of CRC code will be needed per x8 memory device. As each memory device is x8, 16b of CRC code will take 2 transfers or bursts (BL2) on a per memory basis to handle the CRC code.

As demonstrated, CRC code transfer will take up BL2 for each x4 or x8 memory device in the DIMM configurations of FIGS. 3-6, e.g., a DDR5 DIMM arranged with x4 or x8 devices, leaving BL14 for the transmission of data. In one or more embodiments, the data for the last two beats of the BL16 burst for one or more of the data memory devices is redistributed across the memory devices in the memory module, preferably into the one or more spare memory devices. In one or more embodiments, the data in the last two beats of the BL16 burst is moved, transferred, and/or saved into one of the spare devices, and in an aspect, CRC code is added, associated with, saved and/or moved to the last two beats of the BL16 burst of the memory device where the data was before it was moved to the spare.

In one or more aspects, the memory controller will move and/or remap the data from the last two bursts (BL 14 and BL15) for the memory device that the CRC method is enabled to the appropriate location on the spare memory device. The memory controller then generates the CRC code for the data in Bursts 0 through 13 of the data memory device and places that CRC code into burst 14 and 15 for the data memory device on which that CRC technique is enabled. Because the memory devices on the module are configured to store and read sixteen (16) bursts of data for a transaction, in an embodiment where the CRC technique is enabled on a write operation for a data memory device, the CRC code is actually stored in the selected data memory device on the memory module 325.

On a write, in an embodiment, the CRC code is transferred on burst 14 and 15 and checked by the memory device and stored on the memory device as well. In an aspect, on a subsequent read operation, the memory device does not need to generate CRC code as it is already stored as part of the data on the data memory device. In this manner the CRC system and technique saves latency because the CRC code is already generated and stored. The CRC code will be read back and will be transmitted across the bus on burst 14 and burst 15 where the memory controller will be able to check the CRC code. In this manner, the data lane in the bus connected to the memory device over which the CRC is transmitted is checked for transmission errors. When a read occurs the memory controller will receive the CRC code, check the CRC code, and then cast the CRC code aside and get the remainder of the data from the spare memory device.

Figure 7:
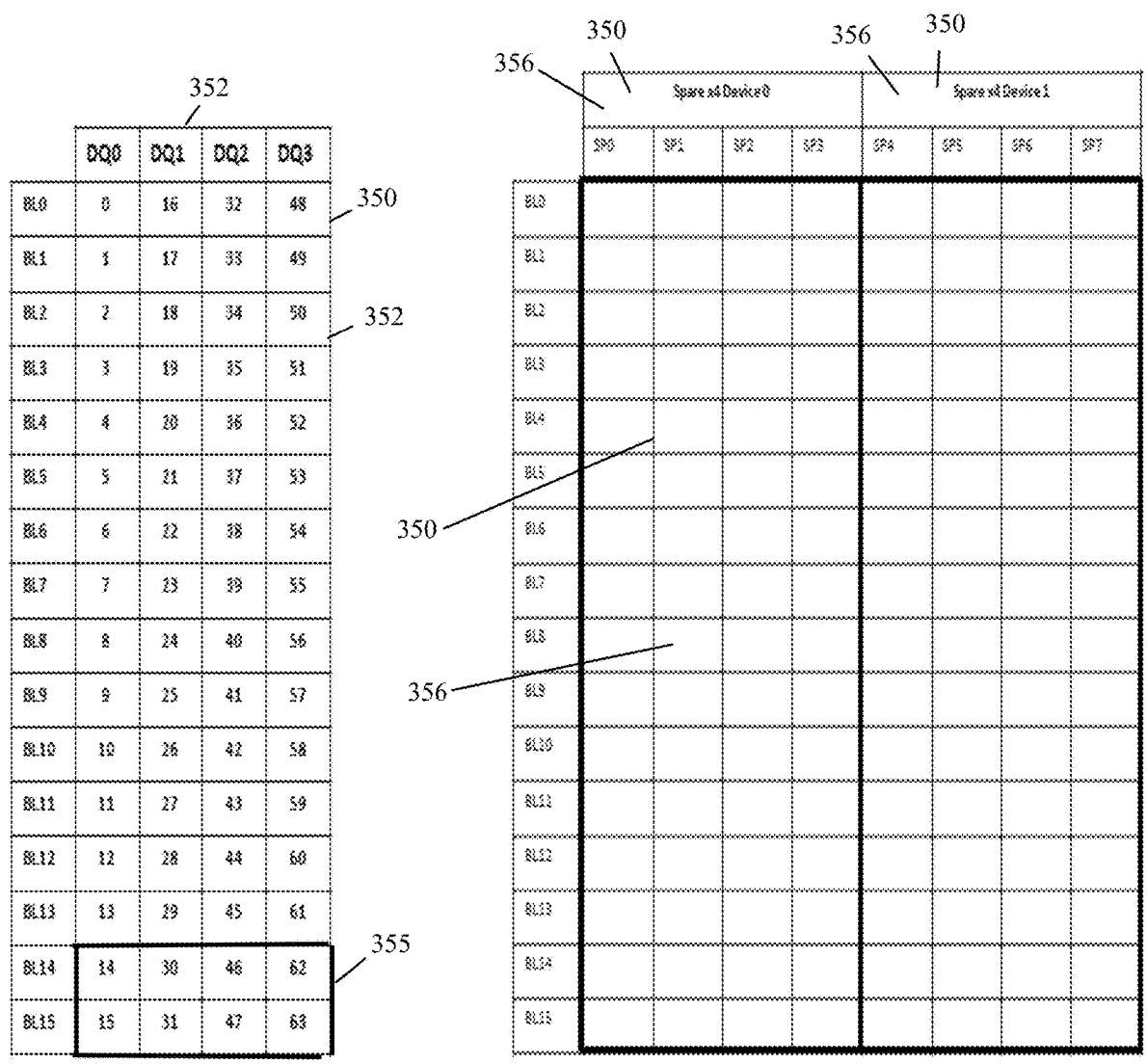
FIG. 7 depicts the bit mapping of a data memory device and two spare memory devices on a memory module where the module is in a single channel lockstep mode of operation in accordance with an embodiment of the present disclosure.

Referring to FIG. 7, the data bit mapping is shown for one of the x4 data memory devices 352 used for example in FIG. 4 as well as the data mapping of two of the spare x4 memory devices 356 where the memory module is configured to operate as a single channel with an eighty (80) bit interface 208 and bus 215 where both channels (channel 0 and channel 1) operate in lockstep. As will be appreciated, while FIG. 7 differentiates between the spare memory devices 356, the data memory devices 352, and the ECC memory devices 354 (not shown) for purposes of illustration and explanation, each of the spare memory devices 356, ECC memory devices 354, and the data memory devices 352 can and most likely have the same configuration. As shown in FIG. 7, sixty-four (64) bits of data will be transmitted to and from each x4 data memory device 352 during a BL16 burst transaction, with four bits of data being transmitted to or from each x4 memory device 352 per beat or cycle. The spare memory devices 356 in FIG. 7 have no data. In one or more embodiments, CRC can be added to check the interface 208 between one or more of the x4 data memory devices 352 on the memory module 325 and the host, where the CRC code is added to the data memory device 352 whose interface 208 (data bus 342) is to be checked for transmission errors.

Figure 8:
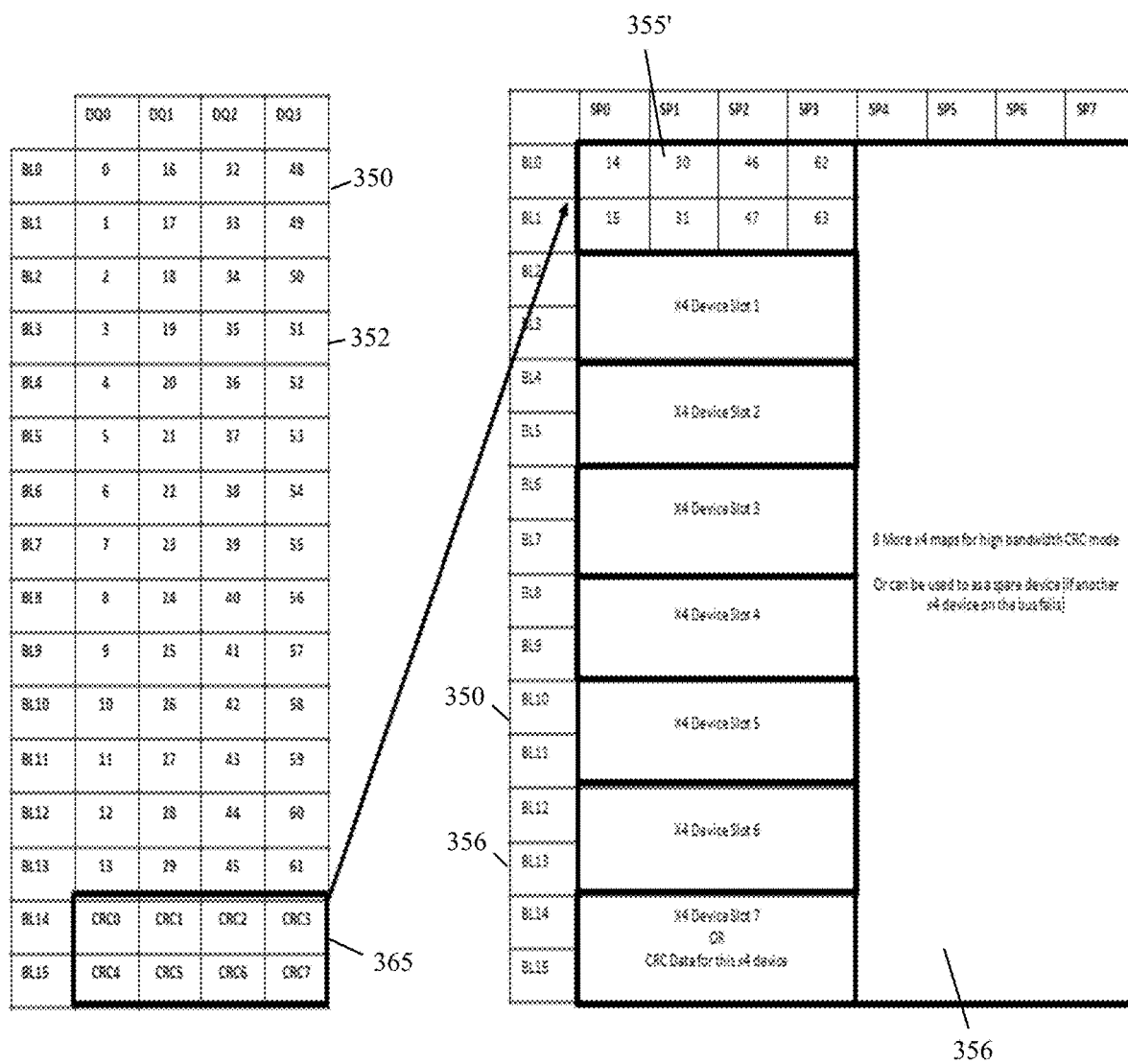
FIG. 8 depicts the bit mapping of the data memory device and two spare memory devices on a memory module operating in a single channel lockstep mode where the data from one of the data memory device has been mapped to one of the spare devices and CRC has been added to the data memory device in accordance with an embodiment of the present disclosure.

FIG. 8 shows the data, the eight bits of data 355 from FIG. 7, from the last two cycles (BL 14 and BL15) of the sixteen (16) bursts of the x4 data memory device 352 being moved, associated with, and/or stored as two cycles of data, the eight bits of data 355', in and/or associated with one of the x4 spare memory devices 356. In one or more embodiments, the memory controller directs and/or controls the transmission of the last two beats of data 355 in the data memory data device 352 to be associated with the spare memory device 356. While FIG. 8 shows the data 355 from the last 2 beats (BL14 and BL15) of the sixteen (16) bursts being associated with and/or directed to the spare x4 memory device 356, it can be appreciated that different beats and bits of data from the x4 data memory device 352 can be moved, associated with, and/or stored in the one or more spare x4 memory devices 356. In addition, while FIG. 8 shows the data 355' being moved to, associated with, and/or saved in the first two beats (BL 0 and BL 1) of the spare x4 memory device 356, it can be appreciated that the data 355 can be directed, moved, stored to and/or associated with different memory cells in the spare memory device 356. FIG. 8 shows CRC code 365 being generated for BL0 through BL 13 for the data memory device 352 and added to, moved to, stored in and/or associated with the last two beats (BL 14 and BL 15) of the data memory device 352. It can be appreciated that while FIG. 8 only shows the data 355 from one data memory device 352 being moved and/or associated with one of the spare memory devices 356, data 355 from multiple data memory devices 352 can be moved to, associated with, and/or stored in one or more of the spare memory devices 356. FIG. 8 shows that each spare x4 memory device 356 can hold two beats worth of the data, e.g., 8b of data, for up to eight (8) x4 data memory devices 352, and that both x4 spare memory devices 356 can hold two beats worth of data from up to sixteen (16) x4 data memory devices 352. Additionally or alternatively, the data 355 from the last 2 beats (burst 15 and 16) of the sixteen (16) bursts from up to eight (8) x4 data memory devices 352 can be transmitted, and/or stored, in one of the spare memory devices 356, keeping the remaining x4 spare memory device 356 as a spare memory device 356.

In addition to checking and protecting the interface 208 (data bus 342/215) between the data memory devices 352 and the host, it can be appreciated that the interface 208 (data bus 342/215) between the memory module 325 (e.g., the x4 ECC memory device 354) and the host can also be protected by the CRC and data redistribution techniques and systems of FIGS. 7-8. In other words, the data in two beats of one or more of the ECC memory devices 354 can be moved, associated with, and/or stored in one or more the spare memory devices 356, and CRC could be generated for bursts BL0 through BL 13 for the ECC memory device 354 and added to, moved to, associated with, and/or stored in one or more of the x4 ECC memory devices 354 so that the interface 208 (data bus 342/215) between the one or more x4 ECC memory devices 354 and the host can be checked. It can also be appreciated, that the interface/bus 208/342 between the one or more x4 spare memory devices 356 and the host can be protected and/or checked with CRC using the techniques shown and explained with reference to FIGS. 7-8. In other words, CRC code could be added to one or more of the x4 spare memory devices 356 holding data that has been moved from one or more of the x4 data memory devices 352 to check the interface 208 and data lanes 342/215 between the one or more spare memory devices 356 and the host. CRC code can be enabled on one or more of the spare memory devices where CRC code could be placed, associated with, and/or added to the last two bursts of the spare memory device 356 (This would reduce the number of data memory devices on the bus where the CRC method could be enabled).

Figure 9:
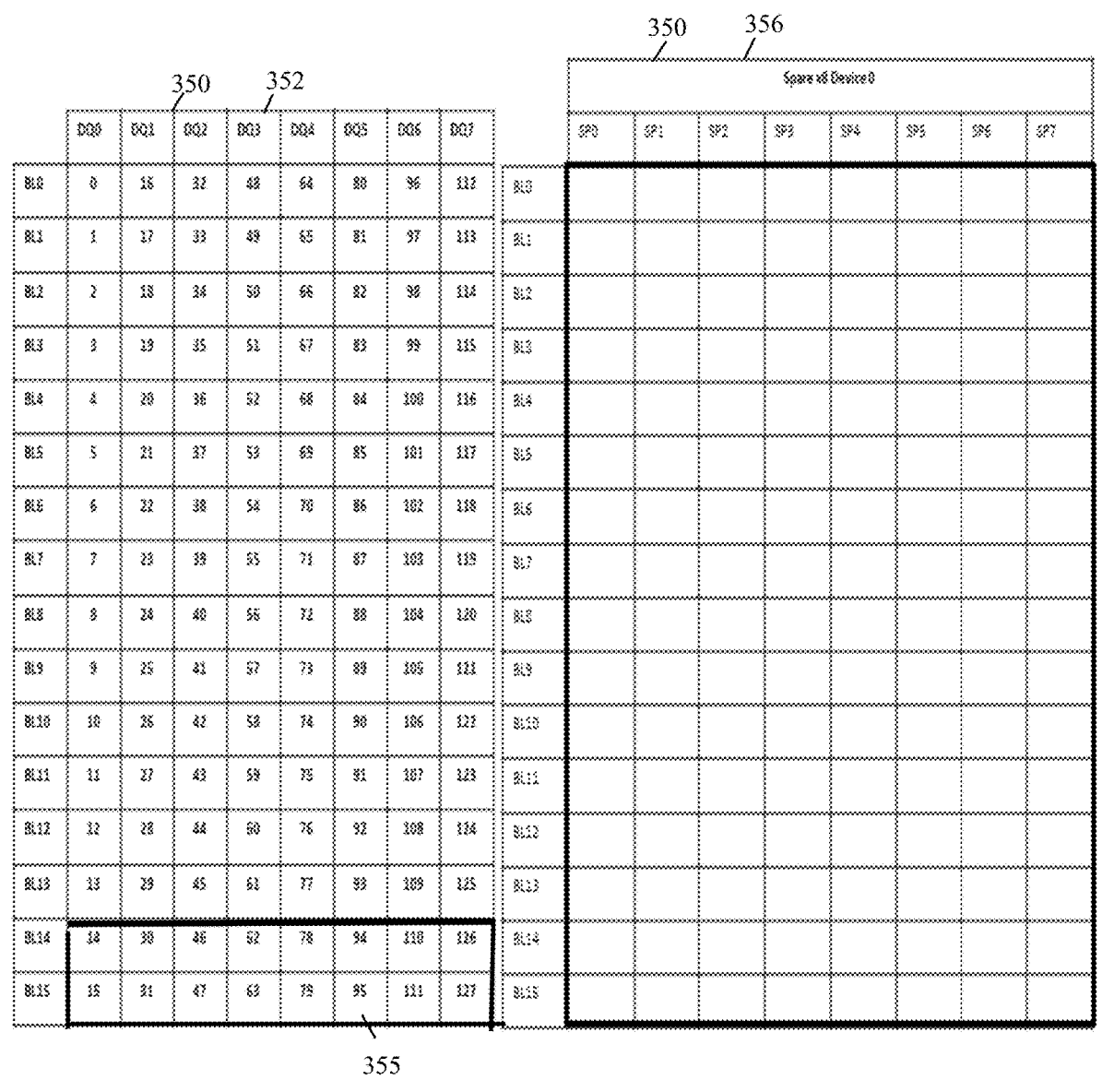

Referring to FIG. 9, the data bit mapping is shown for one of the x8 data memory devices 352 used for example in FIG. 6 as well as the data mapping of a spare x8 memory device 356, where the memory module 325 is configured to operate as a single channel with an eighty (80) bit interface where both channels (channel 0 and channel 1) operate in lockstep. As will be appreciated, while FIG. 9 differentiates between the spare memory device 356, the data memory devices 352, and the ECC memory device 354 (not shown) for purposes of illustration and explanation, the spare memory device 356, the ECC memory device 354, and the data memory devices 352 can and mostly like have the same configuration. As shown in FIG. 9, typically 128 bits of data will be transmitted to or from each x8 data memory device 352 during a BL16 burst transaction, with eight bits of data being transmitted to or from each x8 data memory device 352 per beat or cycle. The spare x8 memory device 356 in FIG. 9 has no data. In one or more embodiments, CRC can be added to check the interface 208 and data bus lanes 342/215 between one or more of the x8 data memory devices 352 on the memory module 325 and the host, where the CRC code is added to and/or associated with the x8 data memory device 352 whose interface 208 (data bus 342) is to be checked for transmission errors.

Figure 10:
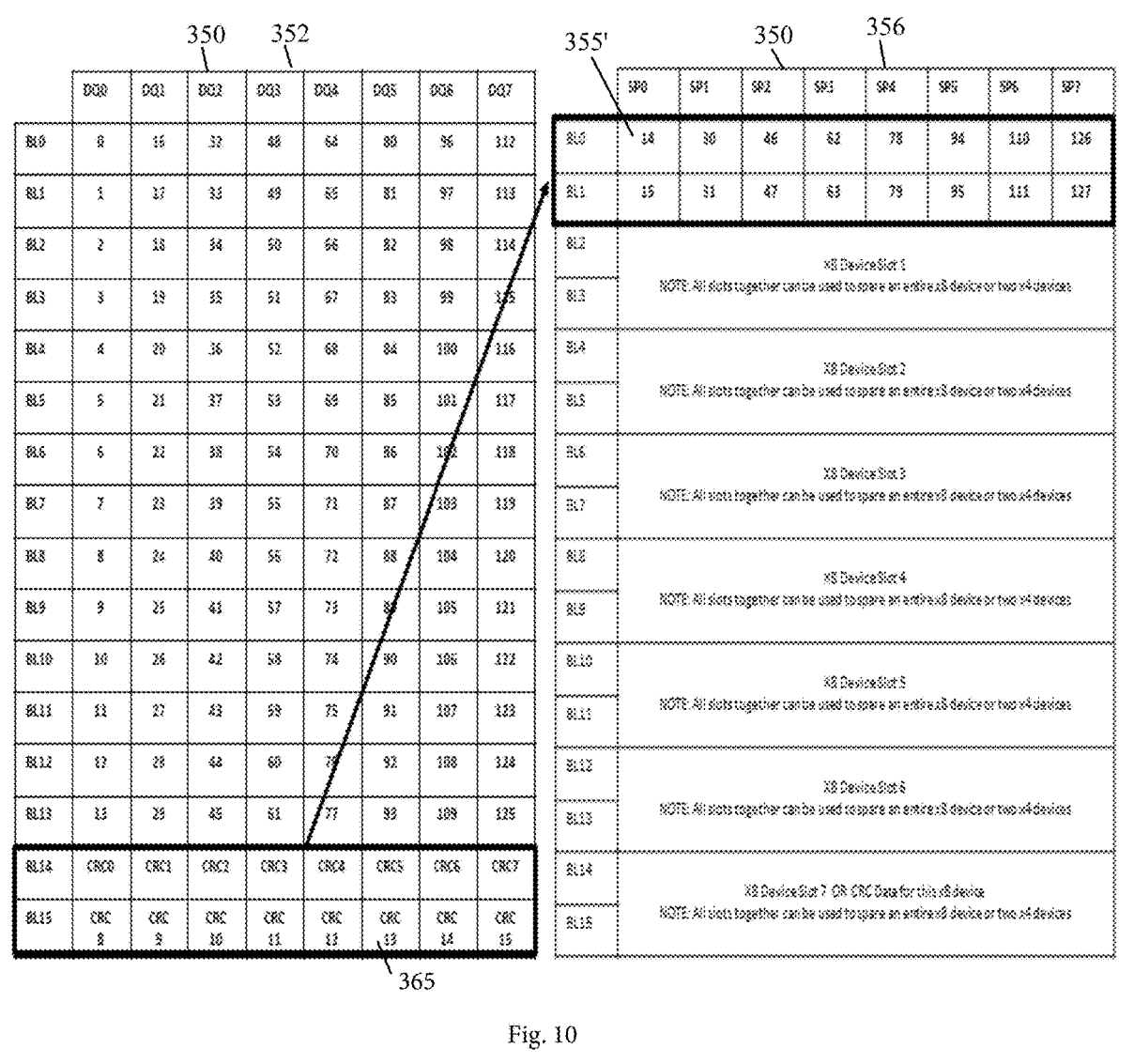

FIG. 10 shows the data, the sixteen (16) bits of data 355 from FIG. 9, from the last two cycles (BL 14 and 15) of data associated with a sixteen (16) burst transaction (BL16) of the x8 data memory device 352 being moved, associated with, and/or stored as two cycles of data, the sixteen (16) bits of data 355', in and/or associated with the x8 spare memory device 356. In one or more embodiments, the memory controller directs and/or controls the transmission of the last two beats of data 355 in the data memory device 352 to be associated with, moved to, and/or stored in the spare memory device 356. While FIG. 10 shows the data 355 from the last 2 beats (Bl14 and BL15) of the sixteen (16) burst transaction (BL16) being associated with and/or directed to the spare x8 memory device 356, it can be appreciated that different beats and bits of data from the x8 data memory device 352 can be moved, associated with, and/or stored in the spare x8 memory devices 356. In addition, while FIG. 10 shows the data 355 being moved to, associated with, and/or saved as data 355' in the first two beats (BL0 and BL1) of the spare x8 memory device 356, it can be appreciated that the data 355 can be directed to, moved to, stored in, and/or associated with different memory cells in the spare memory device 356. FIG. 10 shows CRC code 365 being generated for BL0 through BL13 for the data memory device 352 and added to, moved to, associated with, and/or stored in the last two beats (BL 14 and BL 15) of the data memory device 352. It can be appreciated that while FIG. 10 only shows data 355 from one data memory device 352 being moved to, stored in, and/or associated with spare memory device 356, data 355 from multiple data memory devices 352 can be transferred to the spare memory device 356. FIG. 10 shows that the spare x8 memory device 352 can hold two beats worth of the data 355', e.g., 16b of data, from up to eight (8) x8 memory devices 350.

In addition to checking and protecting the interface 208 and data bus lanes 342/215 between the data memory devices 352 and the host, it can be appreciated that the interface 208 and data bus lanes 342/215 between the x8 ECC memory device 354 and the host can also be protected by the techniques and systems of FIGS. 9-10. In other words, the data 355 in two beats of the ECC memory device 354 can be moved, associated with, and/or stored as data 355' in the spare memory device 356 and CRC 365 could be generated for bursts BL0 through BL13 for the ECC memory device 354 and added to, moved to, associated with, and/or stored in the x8 ECC memory device 354 so that the interface 208 and data bus lane 342/215 between the ECC x8 memory device 354 and the host can be checked. It can also be appreciated, that the interface/bus 208/342 between the x8 spare memory device 356 and the host can be protected and/or checked with CRC as explained and shown by reference to FIGS. 10-12. In other words, CRC code could be added to the x8 spare memory device 356 holding data that has been moved from one or more of the x8 data memory devices 352 (and/or ECC memory device 354) to check the interface 208 and the data bus 342 between the spare memory device 356 and the host. CRC can be enabled on one or more of the spare devices 356 where CRC code could be added to the last two bursts of the spare memory device 356 (This would reduce the number of data memory devices 352 and/or ECC memory devices 354 on the bus where CRC method could be enabled).

Figure 11:
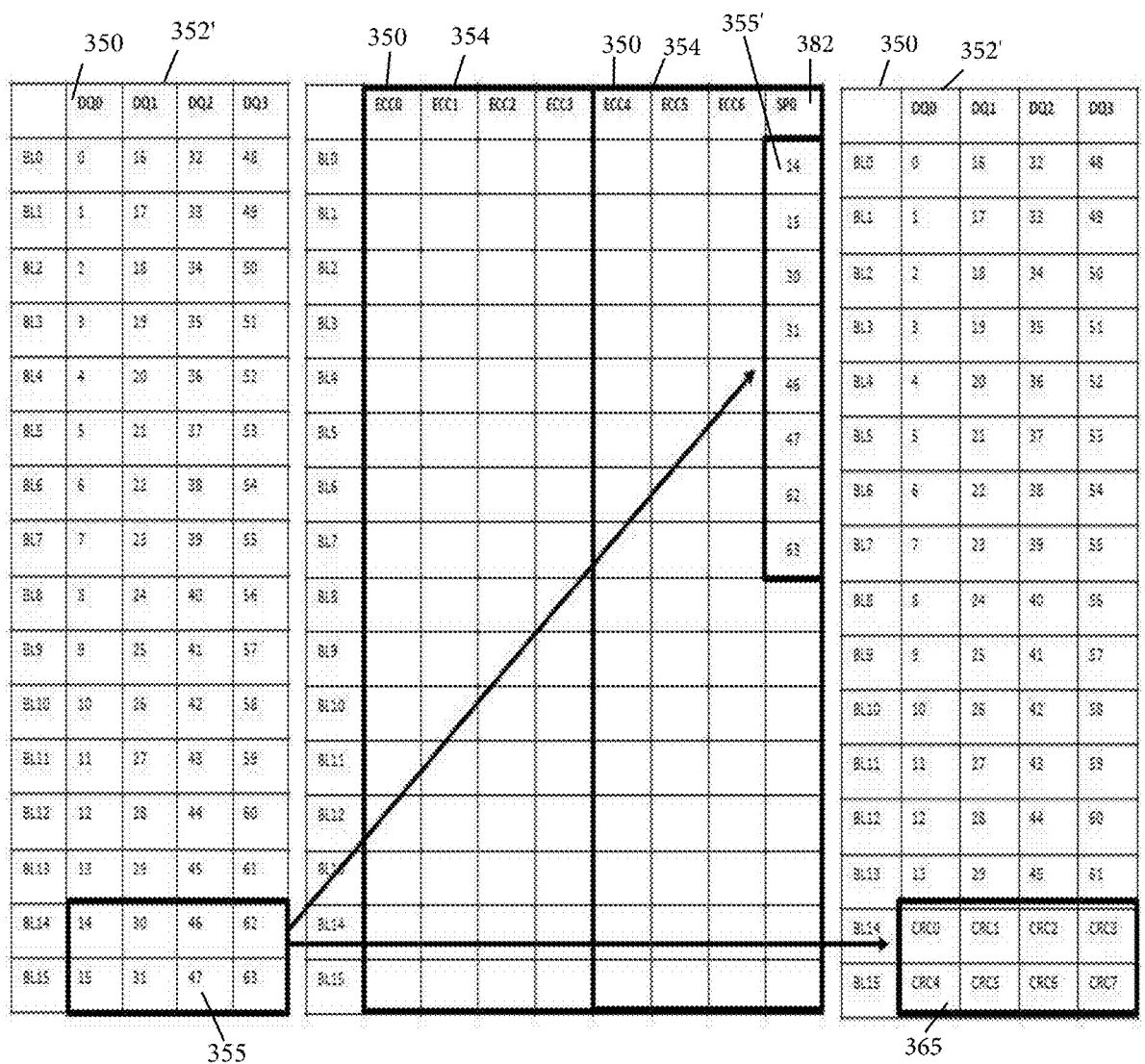
FIG. 11 depicts the bit mapping of data, on a memory module operating as a single channel in normal mode, from a data memory device to a spare bit lane in one of two ECC memory devices where CRC has been added to the data memory device in accordance with an embodiment of the present disclosure.

Referring to FIG. 11, the data bit mapping is shown for one of the x4 data memory devices 352' as well as the data mapping of both of the ECC x4 memory devices 354 used for example in the configuration of FIG. 3 having two channels each channel having a bit width of forty (40) bits. As shown in FIG. 3, channel 0 (and channel 1) has eight data memory devices 352 that can store thirty-two (32) bits of data which require seven (7) bits of ECC leaving one lane in one of the two ECC memory devices 354 as a spare bit lane 382. As will be appreciated, while FIG. 11 differentiates between data memory devices 352 and the ECC memory devices 354 for purposes of illustration and explanation, each of the ECC memory devices 354 and the data memory devices 352 can and most likely have the same configuration. As shown in FIG. 11, 64 bits of data are transmitted per x4 data memory device 352' during a sixteen (16) burst transaction (BL16), with four bits of data being transmitted per beat or cycle, where the last two beats (burst 14 and 15) of data 355 from the x4 data memory device 352 have been moved, directed, saved to, and/or associated with one of the data lanes (DQ7) 382 in one of the ECC memory devices 354, and CRC 365 is added to the last two beats (burst 14 and 15) in the x4 data memory device 352' to replace the data 355 moved to the spare bit lane (shown in right table in FIG. 11) where CRC 365 is used to check the interface 208 and the data bus 342/215 between that x4 data memory device 352' on the memory module 325 and the host.

In one or more embodiments, the memory controller directs and/or controls the transmission of the last two beats (BL 14 and BL15) of data 355 in the data memory device 352 to be associated with the ECC memory device 354. While FIG. 11 shows the data 355 from the last 2 beats of the BL16 burst being directed to and/or associated with one of the x4 ECC memory devices 354, it can be appreciated that different beats and bits of data from the x4 data memory device 352 can be moved, associated with, and/or stored in one of the x4 ECC memory devices 354. In addition, while FIG. 11 shows the data 355 being moved to, associated with, and/or saved as data 355' in the first eight (8) beats (B10-B17) of the last data lane 382 in one of the x4 ECC memory devices 354, it can be appreciated that the data 355 can be directed, moved to stored in, and/or associated with different memory cells in the ECC memory device 354. FIG. 11 shows CRC code 365 being generated for bursts BL0 through BL 13 for the data memory device 352', and added to, moved to, associated with, and/or stored in the last two beats (BL 14 and BL 15) of the data memory device 352'. It can be appreciated that while FIG. 11 only shows the data 355 from one data memory device 352 being moved to, associated with, and/or stored as data 355' in part of spare bit lane 382 in ECC memory device 354, data 355 from multiple data memory devices 352 can be transferred to spare lane 382 as data 355' in one of the ECC memory devices 354. FIG. 11 shows that spare bit lane 382 in one of the x4 ECC memory devices 354 can hold two beats worth of the data, e.g., 8b of data, from up to two (2) x4 data memory devices 350/352.

In addition to checking and protecting the interface 208 and/or the data bus 342 between the data memory devices 352' on the memory module 352 and the host, it can be appreciated that the interface 208 and/or the data bus 342 between the x4 ECC memory devices 354 and the host can also be protected by the techniques and systems of FIG. 11. In other words, the data in two beats of each of the ECC memory devices 354 can be moved to, associated with, and/or stored in one of the ECC memory devices 354, including to the spare bit lane 382, and CRC 365 could be generated and added to one or both of the x4 ECC memory devices 354 so that the interface 208 and/or the data bus 342 between the one or more x4 ECC memory devices 354 and the host can be checked.

Figure 12A:
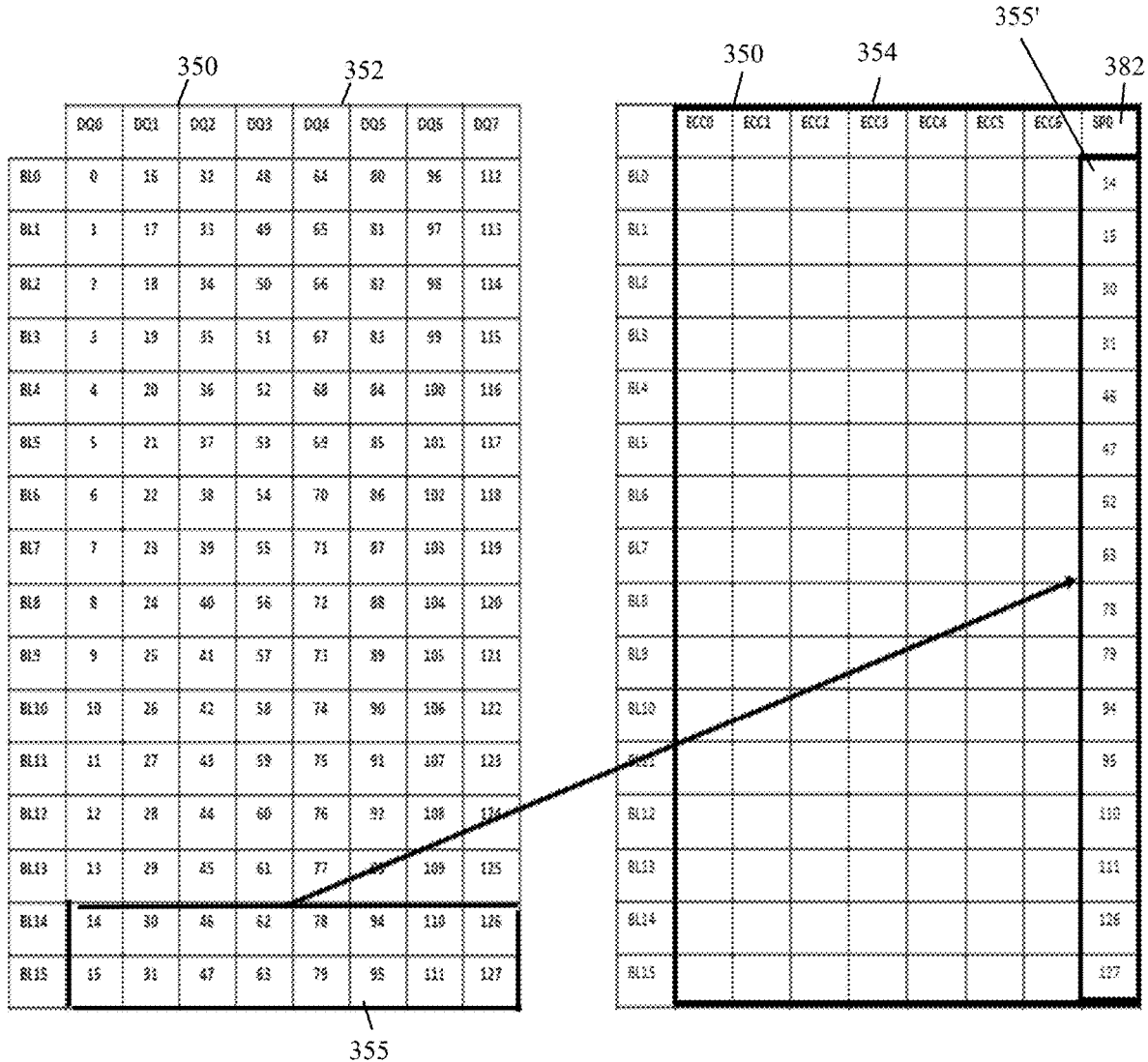

Referring to FIGS. 12A & 12B, the data bit mapping is shown for one of the x8 data memory devices 352 as well as the data mapping of the x8 ECC memory devices 354 used for example in the configuration of FIG. 5, having two channels having a bit width of forty (40) bits. As shown in FIG. 5, channel 0 (and channel 1) has four data memory devices 352 that can store up to thirty-two (32) bits of data which require seven (7) bits of ECC leaving one lane in channel 0 (and channel 1) as a spare bit lane 382 in ECC memory device 354. As will be appreciated, while FIGS. 12A & 12B differentiates between the ECC x8 memory device 354, and the data memory devices 352 for purposes of illustration and explanation, each of the ECC memory devices 354 and the data memory devices 352 can and most likely have the same configuration. As shown in FIG. 12A, 128 bits of data are transmitted per x8 data memory device 352' during a sixteen (16) burst transaction (BL16), with eight (8) bits of data being transmitted per beat or cycle, where the last two beats of data 355 from the x8 data memory device 352 have been moved to, associated with, directed to, and/or saved as data 355' in one of the data lanes 382 in the ECC memory device 354. FIG. 12B shows CRC 365 is added to the last two beats in the x8 data memory device 352' to replace the data 355 where the CRC 365 is used to check the interface 208 and/or data bus 342/215 between that x8 memory device 352' on the memory module 325 and the host.

In one or more embodiments, the memory controller directs and/or controls the transmission of the last two beats (BL 14 and BL 15) of data 355 in the memory data device 352' to be associated with the ECC memory device 354. While FIG. 12A shows the data 355 from the last 2 beats of the BL16 burst being directed to and/or associated with the x8 ECC memory device 354, it can be appreciated that different beats and bits of data from the x8 data memory device 352 can be moved to, directed at, associated with, and/or stored in the x8 ECC memory device 354. In addition, while FIG. 12A shows the data 355 being moved to, associated with, and/or saved as data 355' in the sixteen (16) beats of the last data lane 382 in the x8 ECC memory device 354, it can be appreciated that the data 355 can be directed and/or transmitted to different memory cells in the ECC memory device 354. FIG. 12B shows CRC code 365 being generated for bursts BL0 through BL 13 for the data memory device 352', and added to, moved to, associated with, and/or stored in the last two beats (BL 14 and BL 15) of the data memory device 352'.

In addition to checking and protecting the interface 342 between the data memory devices 352 and the host, it can be appreciated that the interface 208 and data bus lanes 342/215 between the x8 ECC memory device 354 and the host can also be protected by the techniques and systems of FIGS. 12A & 12B. In other words, the data 355 in two beats of the ECC memory device 354 can be moved and/or stored in one of data lanes 382 of the ECC memory device 354, and CRC 365 could be added to the x8 ECC memory device 354 so that the interface 208 and data bus 342/215 between the x8 ECC memory device 354 and the host can be checked.

Other configurations that may provide one or more spare devices can be utilized for the data spreading and the CRC system, architecture, and techniques disclosed herein for transmitting data, ECC and CRC. It will also be appreciated that while the examples in FIGS. 3-12 shows x4 and x8 memory devices, the method and disclosure would have application to x16 memory devices, and or other memory device configurations.

Figure 13:
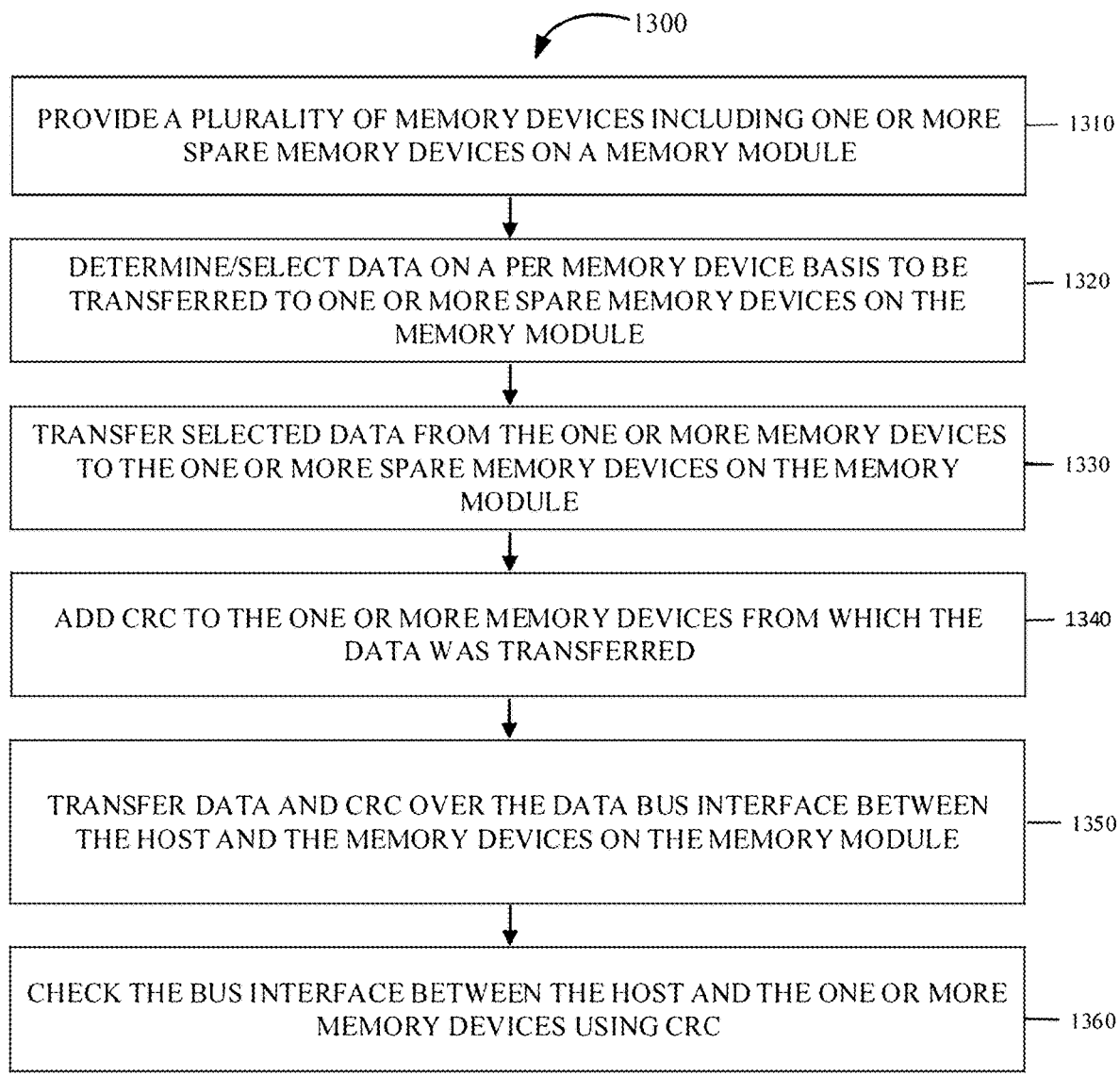
FIG. 13 is a flow diagram of a method of transmitting data with CRC protection between a processor/host and a memory system.

FIG. 13 is an exemplary flowchart in accordance with one embodiment illustrating and describing a method of transmitting CRC code between a host and a memory system, including memory devices and/or memory modules, such as, for example DIMMs, in accordance with an embodiment of the present disclosure. While the method 1300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 13, but the process may be integrated and/or one or more steps may be performed together, simultaneously, or the steps may be performed in the order disclosed or in an alternate order.

The method or process 1300 starts at 1310 where a plurality of data memory devices and one or more spare memory devices and/or ECC memory devices are provided on a memory module. It should be appreciated that the data memory devices, the spare memory devices, and/or the ECC memory devices can be the same, but are configured for different purposes. It should also be appreciated although one or more spare memory devices are provided on the memory module, that one or more of the spare and/or data memory devices can be configured for ECC. The memory devices, e.g., the data memory devices, the ECC memory devices, and/or spare memory devices, can be x4, x8, x16 or other configurations. In one or more embodiments the memory module is a DIMM, and in an aspect the memory devices are DRAMs. In one or more embodiments, a host and/or processor is provided, where in an embodiment the host and/or processor has a memory controller to control communications and transfer of information and data between the host/processor and the memory system. In an aspect, the system further includes a host/processor/memory controller interface with the memory system, and in an embodiment a data bus between the host/processor/memory controller and the memory system for transmitting information and data.

At 1320 it is determined on per memory device basis what data is to be transferred to and/or associated with one or more of the spare modules on the memory module. In one or more embodiments the memory device is selected and/or the bursts of data from the selected memory device for transfer is selected. In an example, the system selects the memory device whose interface is to be checked, and selects the data to be moved to and/or associated with the spare memory device, including which bursts of data are selected to be moved to and/or associated with one or more spare memory devices. In an embodiment, the memory controller determines the memory device and the data from the memory device to be moved to and/or associated with the spare memory device. In an embodiment, two bursts of data, preferably the last two bursts of data, from one or more memory devices, e.g., data memory devices, are selected to be transferred to and/or associated with a different memory device, preferably one or more of the memory devices configured as spare memory devices. It can be appreciated that in one or more embodiments, data is selected from more than one memory device, and in an aspect from all the memory devices configured to transfer data, e.g., all the data memory devices.

The method continues at 1330 where the data selected and/or determined for transfer to or association with a different memory device is moved to and/or associated with one or more different memory devices, and preferably data is moved from and/or no longer associated with one or more of the data memory devices and moved to, associated with, and/or stored in one or more of the spare memory devices. In an embodiment, the memory controller moves or associates the selected data from one or more of the memory devices to one or more different memory devices, preferably to the spare memory devices. In an example, the last two bursts of data are selected from one or more memory devices and moved to and/or associated with one or more spare memory devices. At 1340, CRC is generated for the data on the data memory device and is added to, and in an aspect replaces the data in, the one or more memory devices from which the selected data was moved and/or no longer associated with. At 1350, the data and the CRC, and in embodiments ECC, is transferred over the bus between the host/processor/memory controller and the one or more memory devices on the memory module.

The method and technique 1300 can be utilized for both read and/or write operations. In a read operation, the data and CRC are transferred or transmitted from the one or more memory devices, preferably including the spare memory devices, over a data bus to the host/processor/memory controller; and in a write operation, the data and CRC are transferred or transmitted from the host/processor/memory controller over a data bus to the one or more memory devices, including preferably the spare memory devices. It should be appreciated, that the transfer of data and CRC during a memory access burst transaction preferably includes transfer of ECC, and that the memory module preferably includes one or more ECC memory devices.

At 1360, the bus interface between the host and one or more memory devices that transferred CRC is checked. In an aspect, on a read operation, the host, in an embodiment the memory controller, checks the CRC code to determine if the transfer was corrupted or otherwise faulty, e.g., checks to determine whether the transferred CRC code matches the code generated by the host/processor/memory controller. On a write operation, in one or more embodiments the memory device checks the CRC code to determine if the transfer was corrupted or otherwise faulty, e.g., checks to determine whether the transferred CRC code matches the code generated by the memory device. If the transferred CRC code matches the code generated by the host/processor/memory controller on a read operation or the code generated by the memory device on a write operation, then the transfer between the memory device and host/processor/memory controller is considered okay. If on the other hand, there is not a match between the transferred CRC code and the code generated at the memory device or host/processor/memory controller, then the data transfer is considered faulty, and in one or more embodiments the data is discarded.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer readable medium comprising instructions that, in response to being executed by at least one hardware processor, cause the processor to:
select information on a per memory device basis to associate with one or more spare memory devices in a memory system, wherein the memory system has a plurality of memory devices, at least one or more of the plurality of memory devices configured as a data memory device to store data and at least one or more of the plurality of memory devices are configured as a spare memory device;
disassociating the selected information from one or more data memory devices leaving remaining information on the one or more data memory devices;
associating the selected information with one or more spare memory devices;

adding Cyclical Redundancy Check (CRC) code to the remaining information on the one or more data memory devices from which the selected information was disassociated; and transferring the CRC code and the remaining information over a bus between a host and the memory system.

2. The non-transitory computer readable medium of claim 1, further comprising instructions that, in response to being executed by at least one hardware processor, cause the processor to check the bus between the host and the memory system.

3. The non-transitory computer readable medium of claim 1, wherein the selected information is data from one or more of the data memory devices and the selected data is associated with one or more of the spare memory devices.

4. The non-transitory computer readable medium of claim 1, wherein the plurality of memory devices are configured as a single channel having an interface width wherein one or more bits of the interface width communicate with one or more data memory devices, one or more bits of the interface width communicate with one or more memory devices configured to handle error correction code (ECC), and one or more bits communicate with one or more spare memory devices, and further comprising instructions that, in response to being executed by at least one hardware processor, cause the processor to select at least two bursts of data from at least one data memory device to be associated with the one or more spare memory devices.

5. The non-transitory computer readable medium of claim 4, further comprising instructions that, in response to being executed by at least one hardware processor, cause the processor to select at least two bursts of data from at least four data memory devices to be associated with the one or more spare memory devices.

6. The non-transitory computer readable medium of claim 1, further comprising instructions that, in response to being executed by at least one hardware processor, cause the processor to:
   transfer the selected information, the remaining information and the CRC code from the plurality of memory devices over the bus to the host;
   check the CRC code transferred over the bus;
   discard the CRC code transferred over the bus; and
   obtain the selected information transferred over the bus to the host.

7. The non-transitory computer readable medium of claim 1, further comprising instructions that, in response to being executed by at least one hardware processor, cause the processor to:
   check the CRC code transferred over the bus between the host and the memory system;
   discard the CRC code transferred over the bus;
   transfer the selected information over the bus from the one or more spare devices to the host;
   transfer the remaining information over the bus from the one or more data memory devices;
   obtain the selected information transferred from the one or more spare memory devices to the host; and
   combine the selected information transferred from the one or more spare memory devices with the remaining information transferred from the one or more data memory devices.

8. The non-transitory computer readable medium of claim 1, further comprising instructions that, in response to being executed by at least one hardware processor, cause the processor to:
   transfer the remaining information, the selected information, and CRC code from the host over the bus to the plurality of memory devices including at least one of the spare memory devices;
   check, by the memory device that receives the CRC code, the CRC code transferred over the bus to the memory device that receives the CRC code;
   save the remaining information, the selected information, and the CRC code in the plurality of memory devices and at least one of the spare memory devices.

9. An information handling system, the information handling system comprising:
   a memory subsystem comprising a plurality of memory devices, the plurality of memory devices including a group of data memory devices configured to store data and at least one spare memory device;
   a processor having a memory controller for controlling the transfer of information between the processor and the memory subsystem;
   a bus between the processor and the memory subsystem, the bus comprising one or more data lanes for transferring information between the processor and each of the plurality of memory devices in the memory subsystem, the information handling system configured to:
   select information on a per memory device basis for transfer to the group of data memory devices to associate with one or more of the spare memory devices;
   disassociate the selected information for transfer from the group of data memory devices leaving remaining information;
   associate the selected information with the one or more of the spare memory devices;
   add Cyclical Redundancy Check (CRC) code to the remaining information; and
   transfer the CRC code and the remaining information over the bus between the processor and the plurality of memory subsystem.

10. The information handling system of claim 9, wherein the system is further configured to:
   check the bus between the processor and the one or more memory devices that received the CRC code.

11. The information handling system of claim 9, wherein the system is further configured to:
   select data from one or more of the data memory devices and associate the selected data with the one or more spare memory devices.

12. The information handling system of claim 9, wherein the plurality of memory devices are configured as a single channel having an interface width wherein one or more bits of the interface width communicate with the group of data memory devices, one or more bits of the interface width communicate with one or more memory devices configured to handle error correction code (ECC), and one or more bits of the interface communicate with one or more memory devices configured as the at least one spare memory device, and wherein the system is further configured to select at least two bursts of data from at least one of the group of data memory devices to be associated with the one or more spare memory devices.

13. The information handling system of claim 12, wherein the system is further configured to select at least two bursts of data from at least four data memory devices from the group of data memory devices to be associated with the one or more spare memory devices.

14. The information handling system of claim 9, wherein the system is further configured:

transfer the remaining information, the selected information, and the CRC code from the plurality of memory devices over the bus to the processor;
check the CRC code transferred over the bus;
discard the CRC code transferred over the bus;
obtain the selected information transferred over the bus; and
combine the selected information transferred over the bus with the remaining information transferred over the bus.

15. The information handling system of claim 9, wherein the memory controller contains circuitry and logic to:
    check the CRC code transferred over the bus;
    discard the CRC code transferred over the bus;
    obtain the selected information transferred over the bus; and
    combine the selected information transferred over the bus with the remaining information.

16. The information handling system of claim 9, wherein the system is further configured to:
    transfer the remaining information, the selected information and the CRC code from the processor over the bus to the plurality of memory devices including the at least one spare memory device;
    check, by the memory device that received the CRC code, the CRC code transferred over the bus;
    save the remaining information and the CRC in at least one of the plurality of memory devices and the selected information in the one or more spare memory devices.

17. A method of transferring information from a processor to a memory system for storing information, the method comprising:
    providing a memory system having a plurality of memory devices configured to store information, wherein at least one memory device is configured as a spare memory device and a group of the memory devices are configured as data memory devices to store data;
    providing a processor configured to handle and process information;
    providing an interface bus between the memory system and the processor to transfer information from the processor to the memory system;
    select a first portion of data on a per memory device basis from data targeting the group of data memory devices for transfer to the spare memory device leaving remaining data on a per memory device basis on the group of data memory devices;
    add cyclical redundancy check (CRC) code to the remaining data on the group of the data memory devices from which the selected data was identified for transfer; and
    transfer the remaining data and the CRC code during a burst transaction over the interface bus from the processor to the group of the data memory devices.

18. The method of claim 17, further comprising saving the remaining data and the CRC code in the group of the data memory devices.

19. The method of claim 18, further comprising:
    transferring the remaining data and the CRC code saved in the one or more of the group of the data memory devices over the interface bus from the one or more of the group of data memory devices to the processor; and
    checking, by a memory controller residing on the processor, the CRC code transferred over the interface bus from the one or more of the group of data memory devices to the processor.

20. The method of claim 17, wherein the memory system has a plurality of memory devices configured as a single channel having an interface width wherein one or more bits of the interface width communicate with one or more of the group of data memory devices, one or more bits of the interface width communicate with one or more memory devices configured to handle error correction code (ECC), and one or more bits communicate with the spare memory device, the method further comprising:
    disassociating two beats of data from at least one burst transaction associated with at least one data memory device leaving remaining data on the at least one data memory device;
    associating the two beats of data dissociated from the at least one burst transaction with the spare memory device;
    adding CRC to the remaining data on the at least one data memory device to replace the two beats of data disassociated from the at least one burst transaction associated with the at least one data memory device;
    transferring the two beats of data associated with the spare memory device during the at least one burst transaction over the bus interface from the processor to the spare memory device; and
    transferring the remaining data and the CRC during the at least one burst transaction over the bus interface from the processor to the at least one data memory device.

* * * * *